(12) United States Patent
Huang et al.

(10) Patent No.: US 11,704,998 B2
(45) Date of Patent: Jul. 18, 2023

(54) SYSTEM AND METHODS FOR AUTOMATIC GENERATION OF REMOTE ASSISTANCE SESSIONS BASED ON ANOMALY DATA COLLECTED FROM HUMAN-DRIVEN VEHICLE

(71) Applicant: Uber Technologies, Inc., San Francisco, CA (US)

(72) Inventors: Michael Guanran Huang, San Francisco, CA (US); Samann Ghorbanian-Matloob, San Francisco, CA (US); Sean Shanshi Chen, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 317 days.

(21) Appl. No.: 16/868,001

(22) Filed: May 6, 2020

(65) Prior Publication Data
US 2021/0312798 A1 Oct. 7, 2021

Related U.S. Application Data

(60) Provisional application No. 63/004,725, filed on Apr. 3, 2020.

(51) Int. Cl.
*G08G 1/01* (2006.01)
*B60W 60/00* (2020.01)
(Continued)

(52) U.S. Cl.
CPC ......... *G08G 1/0133* (2013.01); *B60W 60/005* (2020.02); *B60W 60/0011* (2020.02);
(Continued)

(58) Field of Classification Search
CPC .. G08G 1/0133; G08G 1/0137; G08G 1/0112; G08G 1/205; B60W 60/0011;
(Continued)

(56) References Cited

U.S. PATENT DOCUMENTS

2016/0187141 A1* 6/2016 Kulkarni ................. H04W 4/21
701/537
2018/0023965 A1* 1/2018 Misawa ............. G01C 21/3415
701/495
(Continued)

FOREIGN PATENT DOCUMENTS

WO 2021203079 10/2021

OTHER PUBLICATIONS

Ding et al. "Data Anomaly Detection for Internet of Vehicles Based on Traffic Cellular Automata and Driving Style", Sensors, vol. 19, 2019, 19 pages.
(Continued)

*Primary Examiner* — Alan D Hutchinson
(74) *Attorney, Agent, or Firm* — Schwegman Lundberg & Woessner, P.A.

(57) ABSTRACT

The present disclosure is directed to using anomaly data detected in traffic data to efficiently initiate remote assistance sessions. In particular, a computing system can receive, from a computing device associated with a human-driven vehicle, travel data for the human-driven vehicle. The computer system can identify a navigation anomaly associated with the human-driven vehicle based on the travel data. The computer system can generate, based on the identified navigation anomaly, an anomaly entry for storage in an anomaly database, the anomaly entry comprising geofence data describing a geographic area associated with the navigation anomaly. The computer system can determine, based on location data received from an autonomous vehicle and
(Continued)

the geofence data, that the autonomous vehicle is entering the geographic area associated with the navigation anomaly. The computer system can initiate a remote assistance session with the autonomous vehicle.

21 Claims, 10 Drawing Sheets

(51) Int. Cl.
    *G05D 1/00*         (2006.01)
    *H04W 4/029*    (2018.01)
    *H04W 4/021*    (2018.01)

(52) U.S. Cl.
    CPC ....... *B60W 60/0015* (2020.02); *G05D 1/0022* (2013.01); *G08G 1/0137* (2013.01); *H04W 4/021* (2013.01); *H04W 4/029* (2018.02); *G05D 2201/0213* (2013.01)

(58) Field of Classification Search
    CPC ............ B60W 60/0015; B60W 60/005; G05D 1/0022; G05D 2201/0213; G05D 1/0027; H04W 4/021; H04W 4/029; G01C 21/3807; G01C 21/3837; G06F 16/29
    See application file for complete search history.

(56) References Cited

U.S. PATENT DOCUMENTS

| | | | |
|---|---|---|---|
| 2018/0342165 A1* | 11/2018 | Sweeney | G08G 1/0112 |
| 2019/0056742 A1* | 2/2019 | Ho | G05D 1/0214 |
| 2019/0163176 A1* | 5/2019 | Wang | G05D 1/0027 |
| 2020/0341472 A1* | 10/2020 | Zenner | B25J 13/085 |

OTHER PUBLICATIONS

International Search Report and Written Opinion for Application No. PCT/US2021/025711, dated Jun. 28, 2021, 14 pages.

* cited by examiner

SYSTEM AND METHODS FOR AUTOMATIC GENERATION OF REMOTE ASSISTANCE SESSIONS BASED ON ANOMALY DATA COLLECTED FROM HUMAN-DRIVEN VEHICLE

RELATED APPLICATION

This application claims priority to and the benefit of U.S. Provisional Patent Application No. 63/004,725, filed Apr. 3, 2020, which is hereby incorporated by reference in its entirety.

FIELD

The present disclosure relates generally to autonomous vehicles. More particularly, the present disclosure relates to effectively providing support to autonomous vehicles via remote operators.

BACKGROUND

As autonomous vehicle driving technology improves, autonomous vehicles have become increasingly useful in a number of technology fields. One potential use of autonomous vehicles is to provide on-demand transportation services to passengers and organizations that have the need for transportation services. Such services can include a passenger transportation service, a courier service, and a delivery service. Managing such an on-demand transportation service can include providing a variety of services to passengers and autonomous vehicles. For example, a service provider can provide remote assistance to a plurality of autonomous vehicles, especially in cases where the autonomous vehicles encounter problems that they cannot solve independently.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by a computing system with one or more processors from a computing device associated with a human-driven vehicle, travel data for the human-driven vehicle. The method can include identifying, by the computing system, a navigation anomaly associated with the human-driven vehicle based on the travel data. The method can include generating, by the computing system and based on the identified navigation anomaly, an anomaly entry for storage in an anomaly database, the anomaly entry comprising geofence data describing a geographic area associated with the navigation anomaly. The method can include determining, by the computing system and based on location data received from an autonomous vehicle and the geofence data, that the autonomous vehicle is entering the geographic area associated with the navigation anomaly. The method can include initiating, by the computing system, a remote assistance session with the autonomous vehicle.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
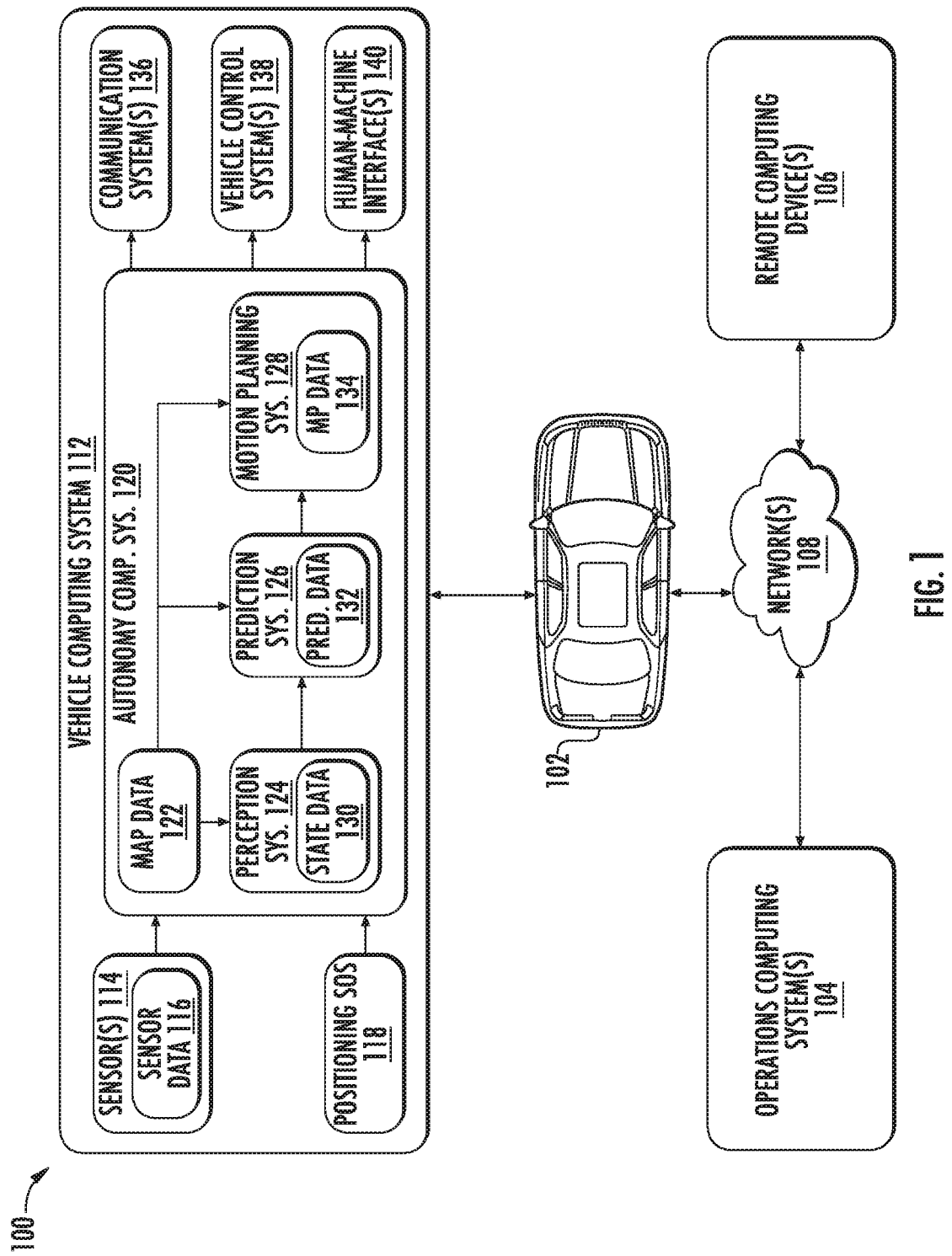
FIG. 1 depicts a block diagram of an example autonomous vehicle according to example embodiments of the present disclosure.

Generally, the present disclosure is directed to a system for determining, based on traffic data gathered from vehicles with human drivers, one or more navigation anomalies that represent situations in which remote assistance sessions may be needed for autonomous vehicles. Using the gathered data, an anomaly monitoring system can determine a geographic location associated with a particular anomaly. Once this geographic location has been established, the anomaly monitoring system can determine when an autonomous vehicle has crossed into the geographic location associated with a particular anomaly. The anomaly monitoring system can initiate a remote assistance session with the autonomous vehicle without the autonomous vehicle needing to request such a session. In this way, the service entity associated with the autonomous vehicle can more efficiently provide remote assistance to autonomous vehicles in situations where remote assistance may be needed.

For example, an anomaly monitoring system can receive data from a vehicle driven by a human (e.g., via a smartphone or beacon associated with the vehicle or driver) that indicates that the human-driven vehicle has made several stops in a small geographic area. The anomaly monitoring system can obtain historical data for that geographic location to determine whether or not such stops are within normal navigation behavior of vehicles travelling through that geographic area. In accordance with the determination that, based on historical data, the stops are not within expected navigation behavior, the anomaly monitoring system can determine that a navigation anomaly exists at that geographic location. Once an anomaly has been determined to exist, the anomaly monitoring system can access an anomaly database for that geographic location to determine whether an anomaly entry already exists for the determined anomaly. If an anomaly entry already exists in the anomaly database for that geographic location, the anomaly monitoring system can update the existing anomaly entry to increase the confidence value associated with that anomaly (e.g., the degree to which the system is confident that an anomaly actually exists at that location). If no anomaly entry currently exists for that geographic location, the anomaly monitoring system can create an entry for that anomaly, including but not limited to, geographic data associated with the anomaly.

The anomaly monitoring system can determine, based on location data received from one or more autonomous vehicles, that an autonomous vehicle is entering a geographic location associated with a known navigation anomaly. For example, the anomaly monitoring system can detect that an autonomous vehicle is crossing a geofence boundary around the navigation anomaly. The anomaly monitoring system can determine a confidence value associated with the anomaly entry. If the confidence value for the anomaly entry exceeds a predetermined threshold, the anomaly monitoring system can initiate a remote assistance session with a remote operator to assist the autonomous vehicle in dealing with the anomaly (e.g., to maneuver around an obstacle, classify objects to enable onboard navigation, etc.).

An autonomous vehicle can include a vehicle computing system. The vehicle computing system can be responsible for, among other functions, creating the control signals needed to effectively control an autonomous vehicle. The vehicle computing system can include an autonomy computing system. The autonomy computing system can include one or more systems that enable the autonomous vehicle to plan a route, receive sensor data about the environment, perceive objects within the vehicle's surrounding environment (e.g., other vehicles), predict the motion of the objects within the surrounding environment, generate trajectories based on the sensor data, and perception/predicted motion of the objects, and, based on the trajectory, transmit control signals to a vehicle control system and thereby enable the autonomous vehicle to move to its target destination. To accomplish these operations, the autonomy computing system can include, for example, a perception system, a prediction system, and a motion planning system.

To help maintain awareness of the vehicle's surrounding environment, the vehicle computing system (e.g., the perception system) can access sensor data from one or more sensors to identify static objects and/or dynamic objects (actors) in the autonomous vehicle's environment. To help determine its position within the environment (and relative to these objects), the vehicle computing system can use a positioning system and/or a communication system to determine its current location. Based on this location information, the vehicle computing system can access map data (e.g., HD map data, etc.) to determine the autonomous vehicle's current position relative to other objects in the world (e.g., bicycles, pedestrians, other vehicles, buildings, etc.), as well as map features such as, for example, lane boundaries, curbs, and so on.

The vehicle computing system (e.g., the perception system) can utilize the sensor data to identify one or more objects in the local environment of the autonomous vehicle. The sensor data can include, but is not limited to, data acquired via: camera sensors, LIDAR sensors, and RADAR sensors. Using this sensor data, the vehicle computing system can generate perception data that describes one or more object(s) in the vicinity of the autonomous vehicle (e.g., current location, speed, heading, shape/size, etc.).

The generated perception data can be utilized to predict the future motion of the object(s). For example, the vehicle computing system (e.g., the prediction system) can use the perception data to generate predictions for the movement of one or more objects as an object trajectory including one or more future coordinates/points. In some implementations, the perception and prediction functions of the vehicle computing system can be included within the same system.

The vehicle computing system (e.g., motion planning system) can use the perception data, prediction data, map data, and/or other data to generate a motion plan for the vehicle. For example, a route can describe a specific path for the autonomous vehicle to travel from a current location to a destination location. The vehicle computing system can generate potential trajectories for the autonomous vehicle to follow as it traverses the route. Each potential trajectory can be executable by the autonomous vehicle (e.g., feasible for the vehicle control systems to implement). Each trajectory can be generated to comprise a specific amount of travel time (e.g., eight seconds, etc.)

The autonomous vehicle can select and implement a trajectory for the autonomous vehicle to navigate a specific segment of the route. For instance, the trajectory can be translated and provided to the vehicle control system(s) that can generate specific control signals for the autonomous vehicle (e.g., adjust steering, braking, velocity, and so on). The specific control signals can cause the autonomous vehicle to move in accordance with the selected trajectory.

A service entity (e.g., service provider, owner, manager, platform) can use one or more vehicles (e.g., ground-based vehicles, aerial vehicles, etc.) to provide a vehicle service such as a transportation service (e.g., rideshare service), a courier service, a delivery service, etc. For example, the service entity (e.g., its operations computing system) can receive requests for vehicle services (e.g., from a user) and generate service assignments (e.g., indicative of the vehicle service type, origin location, destination location, and/or other parameters) for the vehicle(s) to perform. The vehicle (s) can be non-autonomous (human-driven) vehicles and/or autonomous vehicles. The autonomous vehicle can include an onboard vehicle computing system such as, for example, those described herein. Moreover, the human driven vehicles and autonomous vehicles can be configured to communicate with one or more computing devices that are remote from the vehicle. For example, a human driven vehicle can be associated with a user device (e.g., a mobile phone of a human driver), which can run an application that can facilitate communication with a remote computing system that can be associated with the service entity, such as the service entity's operations computing system. An autonomous vehicle can communicate with the service entity's operations computing system. The service entity's operations computing system can include a plurality of system clients that can help the service entity monitor, communicate with, manage, etc. autonomous vehicles. In this way, the service entity can manage the autonomous vehicles to provide the vehicle services of the entity. For example, the operations computing system can include a remote assistance back-end service computing system which can provide a remote assistance service to the vehicles (e.g., autonomous vehicles) utilized by the service entity for the provision of the vehicle service(s), as further described herein.

A user can provide (e.g., via a user computing device) a request for a vehicle service to the operations computing system associated with the service entity. The request can indicate the type of vehicle service that the user desires (e.g., a user transportation service, a delivery service, a courier service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information.

The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system so that the vehicle computing system can communicate with the operations computing system via a network of the service entity. Once online, the operations computing system can communicate a vehicle service assignment indicative of the requested vehicle services and/or other data to the autonomous vehicle.

The service entity can engage with a variety of autonomous vehicle types to provide vehicle services. For example, some autonomous vehicles can be owned and operated by the service entity (e.g., a "first-party autonomous vehicle"), other autonomous vehicles associated with the service entity can be associated with a third-party entity such as, for example, an individual, an original equipment manufacturer (OEM), or another entity (e.g., a "third-party autonomous vehicle"). Another category of autonomous vehicles is possible wherein the autonomous vehicles include some combinations of the features of the first-party autonomous vehicles and the third-party autonomous vehicles. Such autonomous vehicles can be owned by an entity other than the service entity but might include software or hardware that is distributed by the service entity and thereby have the ability to more closely integrate with the service entity.

Even though the third-party autonomous vehicle may not be included in the fleet of autonomous vehicles of the service entity, the platforms of the present disclosure can allow such third-party autonomous vehicles to still be utilized to provide the vehicle services offered by the service entity, access its system clients, etc.

Additionally, the operations computing system of the service entity can also engage with a human-driven vehicle to provide vehicle services. Similar to autonomous vehicles, human-driven vehicles can be engaged to provide some or all of the vehicle services of the service entity. The service entity may engage with a human-driven vehicle for a variety of reasons including, but not limited to availability considerations (e.g., if there are no autonomous vehicles available), cost considerations (e.g., if a human-driven vehicle can result in a lower overall cost to a customer), or safety considerations (e.g., if a particular route is difficult for one type of vehicle to navigate safely). In this way, the service entity can engage with both autonomous vehicles and human-driven vehicles to perform vehicle services.

As described herein, the operations computing system can help support the vehicles via an autonomous vehicle support system. The autonomous vehicle support system can include, for example, a remote assistance service. The remote assistance service can be implemented by a remote assistance system which can receive various types of data that can help facilitate support for the vehicles. For example, the remote assistance system can receive traffic data from one or more human-driven vehicles. In some examples, the traffic data can be received from computing systems (e.g., such as a beacon included in the vehicle or a smartphone associated with the driver of a vehicle). These computing systems can transmit traffic data to the autonomous vehicle support system (e.g., including the remote assistance service).

In some examples, the traffic data can include the location, orientation, heading, velocity, and/or acceleration data from the computing system associated with the human-driven vehicle. In some example embodiments, the traffic data can be first transmitted to a vehicle interface API, which allows vehicles to contact the autonomous vehicle services system (and in this case specifically, the remote assistance system). The vehicle interface API can provide a standardized interface for sending traffic data (and other data) to the autonomous vehicle services system or the anomaly monitoring system regardless of the particular vehicle (e.g., a human-driven vehicle or an autonomous vehicle) transmitting the request. Thus, third-party owned vehicles can also transmit traffic data to the vehicle interface API, either directly or via a system controlled by the third-party before being relayed to the vehicle interface API.

The vehicle interface API can transmit (or facilitate the transmittal) of traffic data to the autonomous vehicle services system. The autonomous vehicles services system can include a communication system, an anomaly monitoring system, a remote assistance system, and other systems not directly relevant to the discussion herein. The communication system can receive requests and data by communicating with the vehicle interface API and can transmit the received requests and data to other components of the autonomous vehicle services system as needed. and any other remote systems. The vehicle interface API can direct any data and requests received to the autonomous vehicle services system via the communication system.

Upon receiving traffic data from a particular human-driven vehicle, the communication system can transmit the traffic data to the anomaly monitoring system. The anomaly monitoring system can include a data evaluation system to analyze received traffic data. The data evaluation system can analyze the received traffic data to determine one or more measurable vehicle parameters, including but not limited to: a speed of the vehicle, a number of stops that the vehicle makes and the position of each stop, and the degree to which the vehicle is following an optimal travel route through the geographic location.

For example, the data evaluation system can use the traffic data to determine the location of the vehicle over a plurality of points in time. Based on the location data and the time data, the data evaluation system can calculate the velocity of the human-driven vehicle. Similarly, the data evaluation system can use acceleration data included in the traffic data to determine when and where the vehicle makes a stop and how quickly the vehicle stops. For example, a rapid stop can result in higher acceleration values (as the vehicle rapidly decelerates) than a gradual stop. In addition, the data evaluation system can use known map data to determine an optimal path through the geographic location. The data evaluation system can compare the optimal path to the actual path the vehicle takes (as determined by the traffic data) through the geographic location. A significant deviation from an optimal path may indicate that at least a portion of the optimal path is no longer passable or is delayed in some way.

The data evaluation system can access a historic navigation database to determine whether one or more properties of the traffic data fall outside the expected range for the given geographic location. For example, the data evaluation system can determine an average speed for the human-driven vehicle travelling through a given geographic location. The data evaluation system can access the historic traffic database to determine a range of expected average speeds for the current geographic location based on past gathered traffic data. In some examples, the historic traffic database can also give information about a specific time at which particular average speeds are to be expected. For example, different times of day may have different expected speeds. In addition, different days of the week may have different expected speeds. For example, weekend days may have more or less traffic than weekdays and thus a given geographic location will have different expected speeds during those days. The historic navigation database can also store data based on specific days within the year such as holidays or the days associated with specific events (e.g., sporting events or elections).

In some examples, the data evaluation system can determine, based on the retrieved historical navigation data, whether or not the current traffic data is associated with a navigation anomaly. For example, the data evaluation system can determine whether the difference between the current speed of a human-driven vehicle and an expected speed (e.g., based on historical data) is within a predetermined threshold value.

In accordance with a determination that the difference between the analyzed traffic data for the human-driven vehicle and historical navigation data exceeds a threshold difference value, the data evaluation system can generate anomaly data. Anomaly data can represent a potential anomaly including data representing at least one of an anomaly type, an anomaly location, and/or a confidence value. In some examples, the confidence value represents the degree to which the data evaluation system is confident that the determined anomaly actually exists.

The confidence value can be generated based on the anomaly type and the quality of the traffic data. Some anomaly types can be more difficult to accurately detect than others. For example, if a human-driven vehicle travels along a route that deviates from the optimal route, the data evaluation system can initially have low confidence that an anomaly exists because a human-driven vehicle may have a variety of potential reasons for departing from the optimal route. If a similar pattern of route alteration is identified with other human-driven vehicles the data evaluation system can increase the confidence value associated with that potential anomaly.

In some examples, if traffic data describes the human-driven vehicles taking an alternate route that is consistent, the data evaluation system can store the altered route associated with an anomaly in the anomaly entry associated with the anomaly. Thus, the services system can automatically redirect autonomous vehicles away from the anomaly by following the alternate route used by the human-driven vehicles in some cases. In some examples, the services system can prompt one or more passengers with information describing the anomaly and offering to reroute along the alternate route. In some examples, the autonomy system in the autonomous vehicle can be notified of the alternate route and the autonomy system can determine whether to reroute.

In another example, certain sensors produce more reliable data than others. Thus, the source of the traffic data can be considered when generating a confidence value. In addition, the remote assistance system can request information from the driver of the human-driven vehicle to more accurately determine the location and type of the anomaly.

Once the data evaluation system determines anomaly data for the potential anomaly, the data evaluation system can access an anomaly database to determine whether an anomaly entry (e.g., data representing a particular anomaly) for this anomaly is already stored in the anomaly database. An anomaly entry can include a representation of a potential anomaly associated with a particular geographic location. In some examples, the remote assistance services can generate a geofence around the particular geographic location to denote the boundaries at which remote assistance may be necessary to deal with the anomaly. In some examples, the geofence can be based on the travel time to the anomaly (e.g., the amount of lead time needed to efficiently deal with the anomaly). In other examples, the geofence can be determined based on distance from the potential anomaly.

For example, a newly created anomaly entry can store a geofence by including data indicative of a center point (e.g., that represents the best estimation the data evaluation system can make for the location of the anomaly) and a radial distance. The geofence can be created such that it is a circle with the center point at the center and then a circle around it with a radius equal to the radius distance. In some examples, the radial distance can be determined based on the anomaly type associated with the anomaly. For example, anomalies that could present a danger to the vehicle (road obstacles) may be assigned a greater radius distance than anomalies that represent a delay (e.g., non-functioning traffic lights). In some examples, the radial distance can be determined based on the estimated speed of vehicles in the geographic area surrounding the geofence (e.g., faster speeds are associated with larger radius distances).

While the above describes a geofence in terms of a circular construct, this is provided as an example only. A geofence can be represented by a variety of shapes. For example, the geofence can also be represented by a series of points, the series of points representing vertices of a geofence the plurality of points which are connected by lines joining the points to form a shape that defines the geofenced area. As above, the area bounded by the geofence can be determined by the anomaly type or the characteristics of the geographic area. For example, if an anomaly occurs on a highway, the geofence can be shaped such that only vehicles travelling on the highway will pass through the geofenced area.

If the data evaluation system determines that no anomaly entry exists in the anomaly database for the current anomaly data, the data evaluation system can generate an entry in the anomaly database. The entry can include information describing the anomaly, the anomaly type associated with the anomaly, the location associated with the anomaly, and a confidence value associated with the anomaly.

If the data evaluation system determines that an anomaly entry currently exists for a particular anomaly in the anomaly database, the data evaluation system can update the anomaly entry. Updating the anomaly entry can include generating more specific location data for the anomaly and/or adjusting the confidence value associated with the anomaly. For example, if the current traffic data provides additional data that the anomaly exists, the confidence value associated with the anomaly can be increased.

In some examples, once the anomaly database has been updated, other systems such as the remote assistance system can access that data to determine whether a remote assistance session is necessary. It should be noted that in addition to anomalies determined by the data evaluation system based on traffic data received from human-driven vehicles, the anomaly database can store anomaly entries from data received from third-parties (e.g., partners or other entities that agree to share anomaly data). The remote assistance system can include a location tracking system and a session initiation system. The location tracking system can access that data to improve route generation for navigation systems. In addition, the location tracking system can access an anomaly database to determine whether or not to generate a remote assistance session for an autonomous vehicle.

Computing systems associated with autonomous vehicles can transmit location data to the autonomous vehicle services system. The location data can represent the current position of the autonomous vehicle that transmitted the data. This data can be submitted to the application vehicle interface API and forwarded via the API to the remote assistance services system. For example, location data can be transmitted to the location tracking system. The location tracking system can, based on data included in the anomaly database, determine whether or not the autonomous vehicle has crossed a geofence associated with one or more anomalies.

If the location tracking system determines that the autonomous vehicle has passed through a geofence associated with a particular anomaly, the location tracking system can determine a confidence value associated with a particular anomaly. The confidence value can be based on data associated with the anomaly in the anomaly database. If the confidence value associated with the anomaly exceeds the predetermined threshold, the location tracking system can transmit instructions to the session initiation system to automatically generate a remote assistance session for the autonomous vehicle in question. In some examples, other factors can also be evaluated before a remote assistance session is initiated. For example, a remote assistance session may not be generated if the anomaly type is a type that is easily handled by an autonomous vehicle. For example, an anomaly that creates heavy bumper-to-bumper traffic may not result in the automatic creation of a remote assistance session because autonomous vehicles can often navigate heavy traffic successfully without remote assistance.

In some examples, the location tracking system can determine, based on sensor data generated by an autonomous vehicle within the geographic location of an anomaly, whether the navigation anomaly still exists. If the anomaly does not appear in the sensors of the autonomous vehicle, the location tracking system may lower the confidence value associated with the anomaly or remote the anomaly entry entirely.

Once the location tracking system has determined that a remote assistance session should be initiated, the session initiation system can generate a remote assistance session. In some examples, the process for generating a remote assistance session can include identifying a remote assistance operator to assign to the remote assistance session. In some examples, the remote assistance operator can be selected based on the availability of remote assistance operators. Thus, a remote assistance operator can be selected from the list of currently available remote operators.

In other examples, the session initiation system can determine whether a particular remote assistance operator is associated with the anomaly based on an anomaly entry in the anomaly database. For example, if a particular remote assistance operator has assisted multiple vehicles to navigate the current anomaly (and/or a similar type of anomaly), the session initiation system may select the same remote operator to assist in this current situation. In other examples, a particular remote assistance operator may be associated with a particular autonomous vehicle (e.g., having recently provided remote assistance to the vehicle). In some examples, the remote assistance operator may be associated with a particular anomaly type that matches the current anomaly.

Once the session initiation system has assigned that particular operator the communication system can transmit assistance data to the selected remote assistance operator's system. The remote operator system can display relevant anomaly data on a display associated with the remote assistance operator's system and receive feedback from the remote assistance operator as to the appropriate action the autonomous vehicles should take. In some examples, a remote assistance session involves communication between the remote assistance operator and/or passenger in the vehicle. In other examples, the remote assistance operator can select a particular solution that involves directly controlling the autonomous vehicle. Direct control of the vehicle can include generating a new destination to travel to or controlling the vehicle directly to help it avoid an obstacle. In some examples, the displayed information can include an alternate route commonly used by human-driven vehicles based on traffic data received.

Once a remote operator has selected a particular course of action, data representing those specific actions can be transferred to the communication system as control commands. The communication system can transfer the control commands to the vehicle interface API. The vehicle interface API can transfer the control commands to the autonomy system of the autonomous vehicle. The autonomous vehicle can then carry out the one or more controls using the control command data.

The following provides an end-to-end example of the technology described herein. A human-driven vehicle can travel to or through a particular geographic location. While traveling, the human-driven vehicle can capture traffic data describing its movement in and through the geographic location. In some examples, the path can be totally or partially obstructed by an obstacle. The traffic data generated in response to the obstacle can be analyzed to identify one or more navigational anomalies for the human-driven vehicle without the need for the driver to explicitly report the anomaly. An anomaly monitoring system can detect the navigational anomaly based on the traffic data submitted by the human-driven vehicle.

In some examples, the anomaly monitoring system can generate an anomaly entry in the anomaly database representing the navigational anomaly. Information included the entry can include a geographic location and a geofence associated with the navigational anomaly.

Once the geofence boundaries have been determined, the anomaly monitoring system can track one or more autonomous vehicles based on location data submitted by the autonomous vehicles. When the autonomous vehicle crosses the established geofence boundary, the anomaly monitoring system can initiate a remote assistance session between the autonomous vehicle and a remote operator.

In some examples, the anomaly monitoring system can receive, from a user device associated with a human-driven vehicle, travel data for the human-driven vehicle. Travel data can describe at least one of the average speed, location, direction, heading, or route of the human-driven vehicle. The travel data can also include stop data that describes the location and timing when the human-driven vehicle comes to a stop. For example, the travel data can include data describing the acceleration of the human-driven vehicle. The user device can be a smartphone associated with the driver of the human-driven vehicle, a beacon device placed in the vehicle, and/or a computing system integrated into the human-driven vehicle itself.

The anomaly monitoring system can identify a navigation anomaly associated with the human-driven vehicle based on the travel data. In response to identifying a navigation anomaly associated with the human-driven vehicle based on the travel data, the anomaly monitoring system can determine whether an anomaly entry corresponding to the navigation anomaly exists in the anomaly database. In response to determining that a corresponding anomaly entry exists in the anomaly database, the anomaly monitoring system can update the confidence value associated with the navigation anomaly.

The anomaly monitoring system can generate, based on the identified navigation anomaly, an anomaly entry for storage in an anomaly database, the entry including geofence data describing a geographic area associated with the navigation anomaly. The anomaly monitoring system can determine an anomaly type associated with the identified navigation anomaly. Anomaly types can include, but are not limited to, obstruction anomalies (e.g., an obstacle in the road), an emergency situation anomaly (e.g., an accident or an emergency vehicle passing through the area), a heavy traffic anomaly (e.g., passage through an area significantly slowed by excessive numbers of vehicles), infrastructure breakdown (e.g., traffic light power off such that directions are given manually by a law enforcement officer), and so on.

The anomaly monitoring system can determine, based on travel data for the human-driven vehicle, a current average speed of the human-driven vehicle. The anomaly monitoring system can access past average speed data for a geographic location associated with the human-driven vehicle to determine a past average speed. The anomaly monitoring system can determine whether the difference between the current average speed of the human-driven vehicle and the past average speed exceeds a threshold. The anomaly monitoring system can, in accordance with a determination that the difference between the current average speed of the human-driven vehicle and the past average speed exceeds a threshold, determine that the navigation anomaly exists.

The anomaly monitoring system can determine, based on travel data for the human-driven vehicle, one or more stopping points for the human-driven vehicle. The anomaly monitoring system can access past stopping data for a geographic location associated with the human-driven vehicle. The anomaly monitoring system can compare the one or more stopping points for the human-driven vehicle to the past stopping data for the geographic location.

The anomaly monitoring system can determine, based on travel data for the human-driven vehicle, a current route for the human-driven vehicle. The anomaly monitoring system can access map data for a geographic location associated with the human-driven vehicle to determine an expected route for the human-driven vehicle. The anomaly monitoring system can compare the current route for the human-driven vehicle to the expected route for the human-driven vehicle.

The anomaly monitoring system can determine, based on location data received from an autonomous vehicle, that an autonomous vehicle is entering the geographic area associated with the navigation anomaly. To do so, the anomaly monitoring system can receive current location data for the autonomous vehicle. The anomaly monitoring system can compare the current location data to geofence data associated with one or more anomaly entries in the anomaly database. In response to determining that the current location data is within a location indicated by the geofence data associated with a specific anomaly entry in the anomaly database, the anomaly monitoring system can analyze travel data associated with the autonomous vehicle to confirm the existence of the navigation anomaly.

In some examples, vehicles (e.g., both human-driven and autonomous) can download geofence data for any geofences that are nearby their current location. The vehicles themselves can monitor their location and notify the anomaly monitoring system if they cross any of the downloaded geofences. The geofence data can be updated as the vehicle travels, removing geofence data for geofences that become too remote and adding geofence data for geofences that are now closer.

In response to confirming, based on the travel data associated with the autonomous vehicle, the existence of the navigation anomaly, the anomaly monitoring system can increase the confidence value associated with the navigation anomaly in the anomaly database. In response to being unable to confirm, based on the travel data associated with the autonomous vehicle, the existence of the navigation anomaly, the anomaly monitoring system can decrease the confidence value associated with the navigation anomaly in the anomaly database.

In response to being unable to confirm, based on the travel data associated with the autonomous vehicle, the existence of the navigation anomaly, the anomaly monitoring system can remove the anomaly entry associated with the navigation anomaly from the anomaly database.

The anomaly monitoring system can determine, based on the anomaly type associated with the identified navigation anomaly, whether the geographic location associated with the identified navigation anomaly is passable. In response to determining that the geographic location associated with the identified navigation anomaly is not passable, the anomaly monitoring system (or other associated system) can generate an alternative route for the autonomous vehicle. A navigation anomaly can be considered passible when the vehicle can continue along the original path to their destination. Thus, a navigation anomaly that results in additional time to a destination but does not necessitate rerouting can be considered passable. For example, an accident that results in one lane of a highway being obstructed but still allows traffic to pass through on the other, unobstructed lanes can be classified as a passable navigation anomaly.

A navigation anomaly can be classified as non-passable if the anomaly is such that the vehicle is no longer able to follow its original route to its destination. For example, if a tree falls across an entire road or an entire section of a highway is flooded, the navigation anomaly will be classified as non-passible.

The anomaly monitoring system can initiate a remote assistance session with the autonomous vehicle. The anomaly monitoring system can access the anomaly entry to determine a particular remote assistance operator previously associated with the navigation anomaly. The anomaly monitoring system can assign the particular remote assistance operator to the remote assistance session.

The anomaly monitoring system can transmit a request for additional information associated with the navigation anomaly to a driver associated with the human-driven vehicle. In other examples, the anomaly monitoring system can select, based on the anomaly entry, a remote assistance operator to provide remote assistance to the autonomous vehicle. The anomaly monitoring system can transmit the anomaly entry to the remote assistance operator.

The systems and methods described herein provide a number of technical effects and benefits. More particularly, the systems and methods of the present disclosure provide improved techniques for generating remote assistance sessions efficiently by leveraging data gathered by human-driven vehicles. For instance, the anomaly monitoring system (and its associated processes) can identify one or more navigational anomalies that may require remote assistance to enable the autonomous vehicle to overcome the anomaly. The anomaly monitoring system can automatically generate a remote assistance session when an autonomous vehicle passes through a geofence associated with the anomaly. Automatically generating the remote assistance sessions reduces the costs associated with generating the remote assistance session manually and reduces the time necessary to react to anomalies. Doing so allows autonomous vehicles to be controlled in a manner that is both safer and more efficient.

In addition, by generating the remote assistance session automatically, the current system removes the need for the autonomous vehicle to request a remote assistance session when needed. By reducing the amount of data analysis and communication the autonomous vehicle is required to do, the anomaly monitoring system can reduce the amount of processor cycles used by the autonomous vehicle, reduces the amount of memory needed to store information, and thereby reduces energy consumption by the autonomous vehicle system as a whole. Reducing energy consumption increases the useful battery life of any battery systems included in the autonomous vehicle.

Various means can be configured to perform the methods and processes described herein. For example, a computing system can include data receiving unit(s), anomaly identification unit(s), data storage unit(s), remote assistance unit(s) and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to receive, from a user device associated with a human-driven vehicle, travel data for the human-driven vehicle. For example, the anomaly monitoring system can receive data representing the travel of a human-driven vehicle to analyze for anomalies. A data receiving unit is one example of a means for receiving, from a user device associated with a human-driven vehicle, travel data for the human-driven vehicle.

The means can be configured to identify a navigation anomaly associated with the human-driven vehicle based on the travel data. For example, the anomaly monitoring system can analyze the received traffic data for unusual traffic patterns to determine the location of one or more navigation anomalies. An anomaly identification unit is one example of a means for identifying a navigation anomaly associated with the human-driven vehicle based on the travel data.

The means can be configured to generate, based on the identified navigation anomaly, an anomaly entry for storage in an anomaly database, the entry including geofence data describing a geographic area associated with the navigation anomaly. For example, the anomaly monitoring system can generate data to add to a database of anomalies including, but not limited to, the location of the anomaly. A data storage unit is one example of a means for generating, based on the identified navigation anomaly, an anomaly entry for storage in an anomaly database, the entry including geofence data describing a geographic area associated with the navigation anomaly.

The means can be configured to determine, based on location data received from an autonomous vehicle, that an autonomous vehicle is entering the geographic area associated with the navigation anomaly and initiate a remote assistance session with the autonomous vehicle. For example, the anomaly monitoring system can determine that, based on location data associated with the autonomous vehicle, the vehicle crossed an established geofence. The anomaly monitoring system can then generate a remote assistance session for the autonomous vehicles. A remote assistance unit is one example of a means for determining, based on location data received from an autonomous vehicle, that an autonomous vehicle is entering the geographic area associated with the navigation anomaly and in response, initiating a remote assistance session with the autonomous vehicle.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that stores data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, bike, scooter, other light electric vehicle, etc.), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy system sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy system sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy system sensor data 116 can be indicative of locations associated with the one or more objects within the surrounding environment of the vehicle 102 at one or more times. For example, autonomy system sensor data 116 can be indicative of one or more LIDAR point clouds associated with the one or more objects within the surrounding environment. The one or more autonomy system sensors 114 can provide the autonomy system sensor data 116 to the autonomy computing system 120.

In addition to the autonomy system sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy system sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy system sensor data 116 from the one or more autonomy system sensors 114, attempt to determine the state of the surrounding environment by performing various processing techniques on the autonomy system sensor data 116 (and/or other data), and generate an appropriate motion plan through the surrounding environment. The autonomy computing system 120 can control the one or more vehicle control systems 138 to operate the vehicle 102 according to the motion plan. One or more of these systems/computing functions can be included within the same system and/or share one or more computing resources.

The perception system 124 can identify one or more objects that are proximate to the vehicle 102 based on autonomy system sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around a vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and it's one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a passenger seat in the back of the vehicle).

Figure 2:
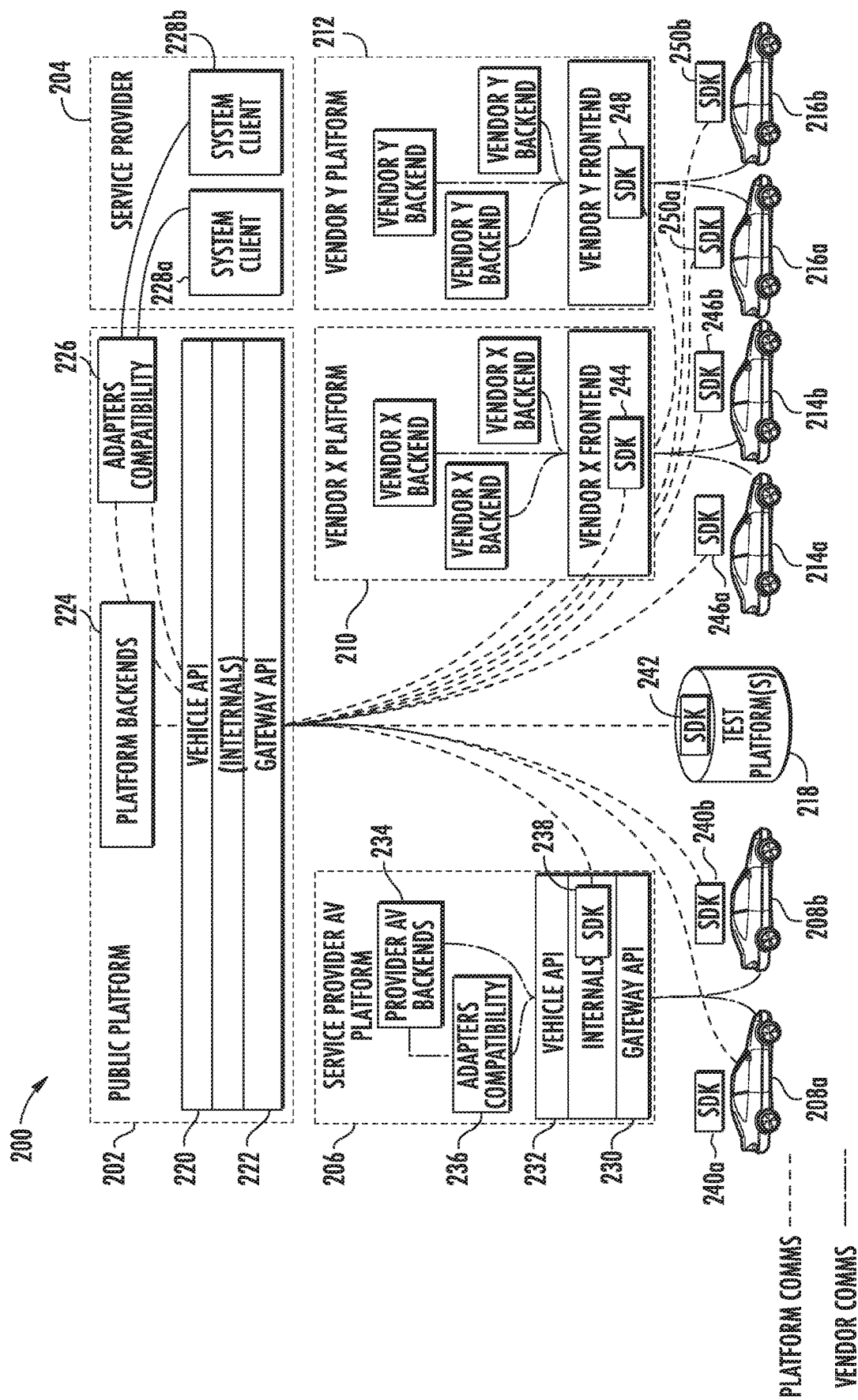
FIG. 2 depicts a block diagram of an example service system according to example embodiments of the present disclosure.

FIG. 2 depicts an example service infrastructure 200 according to example embodiments of the present disclosure. As illustrated in FIG. 2, an example service infrastructure 200, according to example embodiments of the present disclosure, can include an application programming interface platform (e.g., public platform) 202, a service provider system 204, a service provider autonomous vehicle platform (e.g., private platform) 206, one or more service provider autonomous vehicles (e.g., in a service provider fleet) such as autonomous vehicles 208a and 208b, and one or more test platforms 218. Additionally, the service infrastructure 200 can also be associated with and/or in communication with one or more third-party entity systems such as vendor platforms 210 and 212, and/or one or more third-party entity autonomous vehicles (e.g., in a third-party entity autonomous vehicle fleet) such as third-party autonomous vehicles 214a, 214b, 216a, and 216b. In some implementations, the VIP component described herein can include one or more of the platforms and related components illustrated in the service infrastructure 200 of FIG. 2.

As described herein, a service infrastructure 200 can include a public platform 202 to facilitate vehicle services (e.g., provided via one or more system clients (228a, 228b) associated with a service provider operations computing system) between the service provider system 204 (e.g., operations computing system, etc.) and both human-driven vehicles and autonomous vehicles associated with one or more entities (e.g., associated with the service provider (208*a*, 208*b*) or associated with third-party entities (214*a*, 214*b*, 216*a*, 216*b*), etc.). For example, in some embodiments, the public platform 202 can provide access to service provider services (e.g., associated with the service provider system 204) such as trip assignment services, routing services, supply positioning services, payment services, and/or the like.

The public platform 202 can include a gateway API (e.g., gateway API 222) to facilitate communication from both human-driven vehicles and autonomous vehicles to the service provider infrastructure services (e.g., system clients 228*a*, 228*b*, etc.) and a vehicle API (e.g., vehicle API 220) to facilitate communication from the service provider infrastructure services (e.g., system clients 228*a*, 228*b*, etc.) to the human-driven and autonomous vehicles (e.g., 208*a*, 208*b*, 214*a*, 214*b*, 216*a*, 216*b*).

In some embodiments, the public platform 202 can be a logical construct that contains all vehicle and/or service facing interfaces. The public platform 202 can include a plurality of backend services interfaces (e.g., public platform backend interfaces 224). Each backend interface 224 can be associated with at least one system client (e.g., service provider system 204 clients such as system clients 228*a* and 228*b*).

A system client (e.g., 228*a*, 228*b*, etc.) can be the hardware and/or software implemented on a computing system (e.g., operations computing system of the service provider) that is remote from the human-driven and autonomous vehicles and that provides a particular back-end service to a human-driven vehicle or autonomous vehicle (e.g., scheduling of vehicle service assignments, routing services, payment services, user services, etc.). A backend interface 224 can be the interface (e.g., a normalized interface) that allows one application and/or system (e.g., of the autonomous vehicle) to provide data to and/or obtain data from another application and/or system (e.g., a system client). Each backend interface 224 can have one or more functions that are associated with the particular backend interface. An autonomous vehicle can provide a communication to the public platform 202 to call a function of a backend interface. In this way, the backend interfaces can be an external facing edge of the service provider system 204 that is responsible for providing a secure tunnel for a vehicle and/or other system to communicate with a particular service provider system client (e.g., 228*a*, 228*b*, etc.) so that the vehicle and/or other system can utilize the backend service associated with that particular service provider system client (e.g., 228*a*, 228*b*, etc.), and vice versa.

One particular service provided as a back-end service can be the anomaly monitoring system (not depicted) or a remote assistance system. The anomaly monitoring system can receive traffic data from human-driven vehicles that can be used to identify potential navigation anomalies. The potential navigation anomalies can then be used to automatically initiate remote assistance sessions for autonomous vehicles that are near the potential anomalies.

In some embodiments, the public platform 202 can include one or more adapters 226, for example, to provide compatibility between one or more backend interfaces 224 and one or more service provider system clients (e.g., 228*a*, 228*b*, etc.). In some embodiments, the adapter(s) 226 can provide upstream and/or downstream separation between the service provider system 204 (e.g., system clients 228*a*, 228*b*, etc.) and the public platform 202 (e.g., backend interfaces 224, etc.). In some embodiments, the adapter(s) 226 can provide or assist with data curation from upstream services (e.g., system clients), flow normalization and/or consolidation, extensity, and/or the like.

The service infrastructure 200 can include a private platform 206 to facilitate service provider-specific (e.g., internal, proprietary, etc.) vehicle services (e.g., provided via one or more system clients (228*a*, 228*b*) associated with the service provider operations computing system) between the service provider system 204 (e.g., operations computing system, etc.) and autonomous vehicles associated with the service provider (e.g., autonomous vehicles 208*a*, 208*b*). For example, in some embodiments, the private platform 206 can provide access to service provider services that are specific to the service provider autonomous vehicle fleet (e.g., vehicles 208*a* and 208*b*) such as fleet management services, autonomy assistance services, and/or the like.

The private platform 206 can include a gateway API (e.g., gateway API 230) to facilitate communication from the autonomous vehicles 208*a*, 208*b* to one or more service provider infrastructure services (e.g., via the public platform 202, via one or more service provider autonomous vehicle backend interfaces 234, etc.) and a vehicle API (e.g., vehicle API 232) to facilitate communication from the service provider infrastructure services (e.g., via the public platform 202, via one or more service provider autonomous vehicle backend interfaces 234, etc.) to the autonomous vehicles 208*a*, 208*b*. The private platform 206 can include one or more backend interfaces 234 associated with at least one system client (e.g., service provider vehicle-specific system clients, such as fleet management, autonomy assistance, etc.). In some embodiments, the private platform 206 can include one or more adapters 236, for example, to provide compatibility between one or more service provider autonomous vehicle backend interfaces 234 and one or more private platform APIs (e.g., vehicle API 232, gateway API 230).

In some embodiments, the service infrastructure 200 can include a test platform 218 for validating and vetting end-to-end platform functionality, without use of a real vehicle on the ground. For example, the test platform 218 can simulate trips with human drivers and/or support fully simulated trip assignment and/or trip workflow capabilities.

The service infrastructure 200 can be associated with and/or in communication with one or more third-party entity systems, such as third-party entity (e.g., Vendor X) platform 210 and third-party entity (e.g., Vendor Y) platform 212, and/or one or more third-party entity autonomous vehicles (e.g., in a third-party entity autonomous vehicle fleet) such as third-party autonomous vehicles 214*a*, 214, 216*a*, and 216*b*. The third-party entity platforms 210, 212 can be distinct and remote from the service provide infrastructure and provide for management of vehicles associated with a third-party entity fleet, such as third-party entity (e.g., Vendor X) autonomous vehicles 214*a*, 214*b* and third-party entity (e.g., Vendor Y) autonomous vehicles 216*a*, 216*b*. The third-party entity (e.g., Vendor X) platform 210 and third-party entity (e.g., Vendor Y) platform 212, and/or third-party entity (e.g., Vendor X) autonomous vehicles 214*a*, 214*b* and third-party entity (e.g., Vendor Y) autonomous vehicles 216*a*, 216*b* can communicate with the service provider system 204 (e.g., system clients, etc.) via the public platform 202 to allow the third-party entity platforms and/or vehicles to access one or more service provider infrastructure services (e.g., trip services, routing services, payment services, user services, etc.).

The service infrastructure 200 can include a plurality of software development kits (SDKs) (e.g., set of tools and core libraries), such as SDKs 238, 240a, 240b, 242, 244, 246a, 246b, 248, 250a, and 250b, that provide access to the public platform 202 for use by both the service provider autonomous vehicles (208a, 208b) and the third-party entity autonomous vehicles (214a, 214b, 216a, 216b). In some implementations, all external communication with the platforms can be done via the SDKs. For example, the provider entity infrastructure can include both a public SDK and a private SDK and specific endpoints to facilitate communication with the public platform 202 and the private platform 206, respectively. In some embodiments, the service provider autonomous vehicle fleet (e.g., vehicle 208a, 208b) and/or test platform 218 can use both the public SDK and the private SDK, whereas the third-party entity autonomous vehicles (vehicle 214a, 214b, 216a, 216b) can use only the public SDK and associated endpoints. In some implementations, the SDKs can provide a single-entry point into the service provider infrastructure (e.g., public platform 202, etc.), which can improve consistency across both the service provider fleet and the third-party entity fleet(s). As an example, a public SDK can provide secured access to the public platform 202 by both service provider vehicles and third-party entity (and/or systems) and access to capabilities such as trip assignment, routing, onboarding new vehicles, supply positioning, monitoring and statistics, a platform sandbox (e.g., for integration and testing), and/or the like. The private SDK can be accessed by the service provider vehicles and provide access to capabilities such as remote assistance, vehicle management, fleet management, and/or the like.

In some embodiments, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service provider's services. For example, based on the authentication certificate, a command-line interface can determine which version of the SDK (e.g., public or private) to which to provide access.

Figure 3:
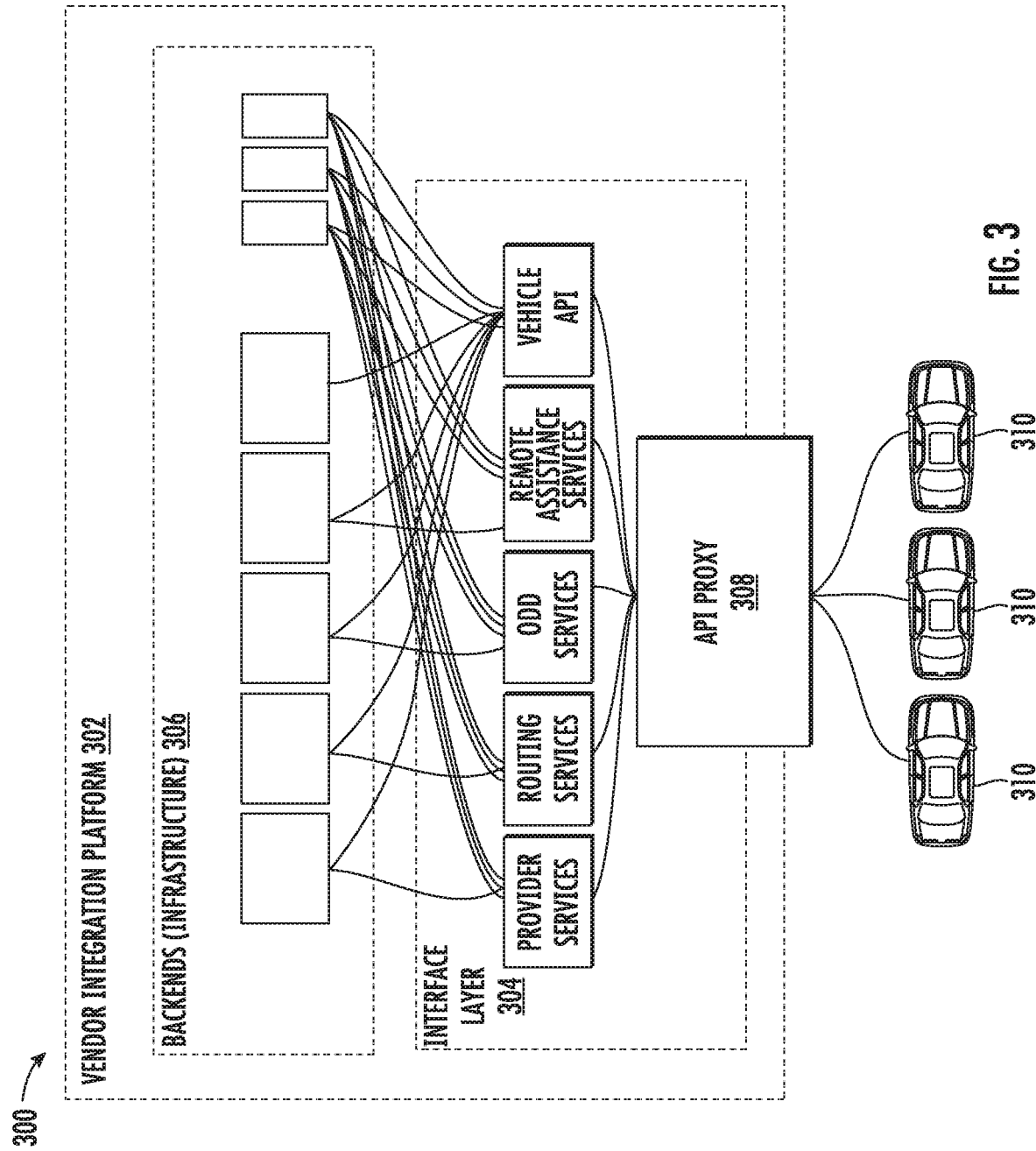
FIG. 3 depicts an example of a multiple entity integration platform according to example embodiments of the present disclosure.

FIG. 3 depicts an example of an entity integration platform 300 according to example embodiments of the present disclosure. As illustrated in FIG. 3, an entity integration platform 300 can include a vendor integration platform (e.g., public platform) 302 in communication with one or more vehicles, such as autonomous vehicles 310, 312, and 314. As described in regard to FIG. 2, the public platform 302 can provide for communication between a plurality of backend services 306 and one or more autonomous vehicles (e.g., 310, 312, and/or 314) via a plurality of interfaces 304. As such, public platform 302 of FIG. 3 can in some embodiments correspond to public platform 202 of FIG. 2, while backend services 306 and/or interfaces 304 of FIG. 3 can in some embodiments correspond to backend interfaces 224 of FIG. 2 and corresponding applications, interfaces, and the like. In some implementations, the public platform 302 can include application programming interface (API) proxy 308 to act as a central gateway to the public platform 302 for communications to/from the autonomous vehicles. In some embodiments, an autonomous vehicle (e.g., 310, 312, and/or 314) can communicate with the API proxy 308 via an SDK associated with the autonomous vehicle, as described herein.

Figure 4:
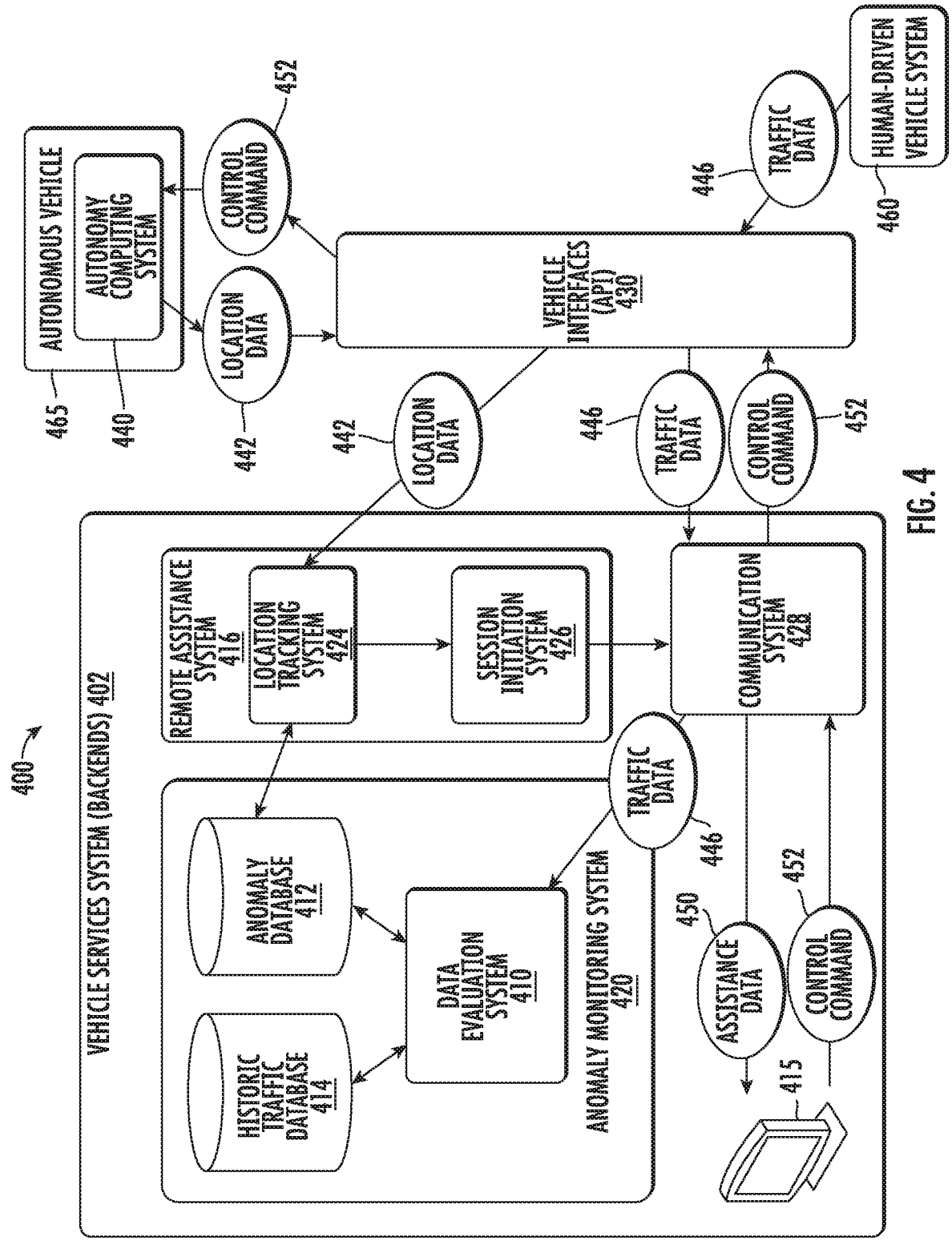
FIG. 4 depicts an example computing system for providing remote autonomous vehicle assistance to autonomous vehicles according to example embodiments of the present disclosure.

FIG. 4 depicts an example computing system 400 for providing remote autonomous vehicle assistance to autonomous vehicles according to example embodiments of the present disclosure. The vehicle services system 402 can help support the vehicles via an autonomous vehicle services system. The vehicle services system 402 can include, for example, an anomaly monitoring system 420 and a remote assistance service 416.

More specifically, the vehicle services system 402 can use the anomaly monitoring system 420 to receive traffic data 446 from human-driven vehicles. Based on the received traffic data 446 the anomaly monitoring system 420 can determine when an anomaly exists and transmit that data to the remote assistance system 416.

A remote assistance service can be implemented by the remote assistance system 416 which can receive various types of data that can help facilitate support for the vehicles. For example, the remote assistance system 416 can receive location data from one or more human-driven vehicles. In some examples, the traffic data 446 can be received from computing systems (e.g., such as a beacon included in the vehicle or a smartphone associated with the driver of a vehicle). These computing systems can transmit traffic data to the autonomous vehicle services system (e.g., including the remote assistance service).

In some examples, the traffic data 446 can include the location, orientation, heading, velocity, and/or acceleration data from the computing system associated with the human-driven vehicle 460. In some example embodiments, the traffic data 446 can be first transmitted to a vehicle interface API 430, which allows vehicles to contact the vehicle services system 402 (and in this case specifically, the anomaly monitoring system 420). The vehicle interface API 430 can provide a standardized interface for sending traffic data 446 (and other data) to the vehicle services system 402 or the anomaly monitoring system 420 regardless of the particular vehicle 460 (e.g., a human-driven vehicle or an autonomous vehicle) transmitting the request. Thus, third-party owned vehicles can also transmit traffic data to the vehicle interface API 430, either directly or via a system controlled by the third-party before being relayed to the vehicle interface API 430.

The vehicle interface API 430 can transmit (or facilitate the transmittal) of traffic data 446 to the vehicle services system 402. The vehicles services system 402 can include a communication system 428, an anomaly monitoring system 420, a remote assistance system 416, and other systems not directly relevant to the discussion herein. The communication system 428 can receive requests and data by communicating with the vehicle interface API 430 and can transmit the received requests and data to other components of the autonomous vehicle services system and/or any other remote systems as needed. The vehicle interface API 430 can direct any received data and requests to the vehicle services system 402 via the communication system 428.

Upon receiving traffic data 446 from a particular human-driven vehicle 460, the communication system 428 can transmit the traffic data 446 to the anomaly monitoring system 420. The anomaly monitoring system 420 can include a data evaluation system 410 to analyze received traffic data 446. The data evaluation system 410 can analyze the received traffic data 446 to determine one or more measurable vehicle parameters, including but not limited to: a speed of the vehicle, a number of stops that the vehicle makes and the position of each stop, and the degree to which the vehicle is following an optimal travel route through the geographic location.

For example, the data evaluation system 410 can use the traffic data 446 to determine the location of the vehicle over a plurality of points in time. Based on the location of the vehicle over the plurality of points in time, the data evaluation system 410 can calculate the velocity of the human-driven vehicle 460. Similarly, the data evaluation system 410 can use acceleration data included in the traffic data 446 to determine when and where the vehicle 460 makes a stop and how quickly the vehicle 460 stops. For example, a rapid stop can result in higher acceleration values (as the vehicle 460 rapidly decelerates) than a gradual stop.

In addition, the data evaluation system 410 can use known map data to determine an optimal path through the geographic location. The data evaluation system 410 can compare the optimal path to the actual path the vehicle 460 takes (as determined by the traffic data) through the geographic location. A significant deviation from an optimal path may indicate that at least a portion of the optimal path is no longer passable or is delayed in some way.

The data evaluation system 410 can access a historic navigation database such as historic traffic database 414 to determine whether one or more properties of the traffic data fall outside the expected range for the given geographic location. For example, the data evaluation system 410 can determine an average speed for the human-driven vehicle travelling through a given geographic location. The data evaluation system 410 can access the historic traffic database 414 to determine a range of expected average speeds for the current geographic location based on past gathered traffic data (e.g., historical navigation data). In some examples, the historic traffic database 414 can also give information about a specific time at which particular average speeds are to be expected. For example, different times of day may have different expected speeds. In addition, different days of the week may have different expected speeds. For example, weekend days may have more or less traffic than weekdays and thus a given geographic location will have different expected speeds during those days. The historic traffic database 414 can also store data based on specific days within the year such as holidays or the days associated with specific events (e.g., sporting events or elections).

In some examples, the data evaluation system 410 can determine, based on historical navigation data retrieved from the historic traffic database 414, whether or not the current traffic data is associated with a navigation anomaly. For example, the data evaluation system 410 can determine whether the difference between the current speed of a human-driven vehicle 460 and an expected speed (e.g., based on the historical data) is within a predetermined threshold value.

In accordance with a determination that the difference between the analyzed traffic data 446 for the human-driven vehicle 460 and historical navigation data exceeds a threshold difference value, the data evaluation system 410 can generate anomaly data. Anomaly data can represent a potential anomaly including data representing at least one of an anomaly type, an anomaly location, and/or a confidence value. In some examples, the confidence value represents the degree to which the data evaluation system 410 is confident that the determined anomaly actually exists.

The confidence value can be generated based on the anomaly type and the quality of the traffic data. Some anomaly types can be more difficult to accurately detect than others. For example, if a human-driven vehicle 460 travels along a route that deviates from the optimal route, the data evaluation system 410 can initially have low confidence that an anomaly exists because a human-driven vehicle 460 may have a variety of potential reasons for departing from the optimal route. If a similar pattern of route alteration is identified with other human-driven vehicles, the data evaluation system 410 can increase the confidence value associated with that potential anomaly. In another example, certain sensors produce more reliable data than others. Thus, the source of the traffic data 446 can be considered when generating a confidence value. In addition, the remote assistance system 416 can request information from the driver of the human-driven vehicle 460 to more accurately determine the location and type of the anomaly.

Once the data evaluation system 410 determines anomaly data for the potential anomaly, the data evaluation system 410 can access an anomaly database 412 to determine whether an anomaly entry (e.g., data representing a particular anomaly) for this anomaly is already stored in the anomaly database 412. An anomaly entry can include a representation of a potential anomaly associated with a particular geographic location. In some examples, the remote assistance system 416 can generate a geofence around the particular geographic location to denote the boundaries at which remote assistance may be necessary to deal with the anomaly. In some examples, the geofence can be based on the travel time to the anomaly (e.g., the amount of lead time needed to efficiently deal with the anomaly). In other examples, the geofence can be determined based on distance from the potential anomaly.

For example, a newly created anomaly entry can store a geofence by including data indicative of a center point (e.g., that represents the best estimation the data evaluation system can make for the location of the anomaly) and a radial distance. The geofence can be created such that it includes a circle with the center point at the center and a boundary equally spaced around the center. For example, the circle can be centered at the center with a radius equal to the radial distance. In some examples, the radial distance can be determined based on the anomaly type associated with the anomaly. For example, anomalies that could present a danger to the vehicle (road obstacles) may be assigned a greater radial distance than anomalies that represent a delay (e.g., non-functioning traffic lights). In some examples, the radial distance can be determined based on the estimated speed of vehicles in the geographic area surrounding the geofence (e.g., faster speeds are associated with larger radial distances).

While the above describes a geofence in terms of a circular construct, this is provided as an example only. A geofence can be represented by a variety of shapes. The geofence can also be represented by a series of points. For example, a series of points can represent vertices of a geofence. The series of points can include a plurality of points which are connected by lines joining the points to form a shape that defines the geofenced area. As above, the area bounded by the geofence can be determined by the anomaly type or the characteristics of the geographic area. For example, if an anomaly occurs on a highway, the geofence can be shaped such that only vehicles traveling on the highway will pass through the geofenced area.

If the data evaluation system 410 determines that no anomaly entry exists in the anomaly database 412 for the current anomaly data, the data evaluation system 410 can generate an entry in the anomaly database 412. The entry can include information describing the anomaly, the anomaly type associated with the anomaly, the location associated with the anomaly, and a confidence value associated with the anomaly.

If the data evaluation system 410 determines that an anomaly entry currently exists for a particular anomaly in the anomaly database 412, the data evaluation system 410 can update the anomaly entry. Updating the anomaly entry can include generating more specific location data for the anomaly and/or adjusting the confidence value associated with the anomaly. For example, if the current traffic data provides additional data that the anomaly exists, the confidence value associated with the anomaly can be increased.

In some examples, once the anomaly database 412 has been updated, other systems such as the remote assistance system 416 can access that data to determine whether a remote assistance session is necessary. The remote assistance system 416 can include a location tracking system 424 and a session initiation system 426. The location tracking system 424 can access that data to improve route generation for navigation systems. In addition, the location tracking system 424 can access an anomaly database 412 to determine whether or not to generate a remote assistance session for an autonomous vehicle.

Autonomy computing systems 440 associated with autonomous vehicles 465 can transmit location data 442 to the vehicle services system 402. The location data 442 can represent the current position of the autonomous vehicle 465 that transmitted the data. This data can be submitted to the application vehicle interface API 430 and forwarded via the API 430 to the remote assistance services system 416. For example, location data 442 can be transmitted to the location tracking system 424. The location tracking system 424 can, based on data included in the anomaly database 412, determine whether the autonomous vehicle 465 has crossed a geofence associated with one or more anomalies.

If the location tracking system 424 determines that the autonomous vehicle 465 has passed through a geofence associated with a particular anomaly, the location tracking system 424 can determine a confidence value associated with a particular anomaly. The confidence value can be based on anomaly data associated with the anomaly in the anomaly database 412. If the confidence value associated with the anomaly exceeds the predetermined threshold, the location tracking system 424 can transmit instructions to the session initiation system 426 to automatically generate a remote assistance session for the autonomous vehicle 465 in question. In some examples, other factors can also be evaluated before a remote assistance session is initiated. For example, a remote assistance session may not be generated if the anomaly type is a type that is easily handled by an autonomous vehicle 465. For example, an anomaly that creates heavy bumper-to-bumper traffic may not result in the automatic creation of a remote assistance session because autonomous vehicles can often navigate heavy traffic successfully without remote assistance.

In some examples, the location tracking system 424 can determine, based on sensor data generated by an autonomous vehicle 465 within the geographic location of an anomaly, whether the navigation anomaly still exists. If the anomaly does not appear in the sensors of the autonomous vehicle 465, the location tracking system 424 may lower the confidence value associated with the anomaly or remote the anomaly entry entirely.

Once the location tracking system 424 has determined that a remote assistance session should be initiated, the session initiation system 426 can generate a remote assistance session. In some examples, the process for generating a remote assistance session can include identifying a remote assistance operator to assign to the remote assistance session. In some examples, the remote assistance operator can be selected based on the availability of remote assistance operators. Thus, a remote assistance operator can be selected from a list of currently available remote operators.

In other examples, the session initiation system 426 can determine whether a particular remote assistance operator is associated with the anomaly based on an anomaly entry in the anomaly database. For example, if a particular remote assistance operator has assisted multiple vehicles to navigate the current anomaly (and/or a similar type of anomaly), the session initiation system 426 may select the same remote operator to assist in this current situation. In other examples, a particular remote assistance operator may be associated with a particular autonomous vehicle (e.g., having recently provided remote assistance to the vehicle). In some examples, the remote assistance operator may be associated with a particular anomaly type that matches the current anomaly.

Once the session initiation system 426 has assigned that particular operator the communication system can transmit assistance data 450 to the selected remote assistance operator's system 415. The remote operator system 415 can display relevant anomaly data on a display associated with the remote assistance operator's system 415 and receive feedback from the remote assistance operator as to the appropriate action the autonomous vehicle 465 should take. In some examples, a remote assistance session involves communication between the remote assistance operator and/or a passenger in the vehicle. In other examples, the remote assistance operator can select a particular solution that involves directly controlling the autonomous vehicle 465. Direct control of the autonomous vehicle 465 can include generating a new destination to travel to or controlling the vehicle 465 directly to help it avoid an obstacle.

Once a remote operator has selected a particular course of action, data representing those specific actions can be transferred to the communication system as control commands 452. The communication system 428 can transfer the control commands to the vehicle interface API 430. The vehicle interface API 430 can transfer the control commands 452 to the autonomy system 440 of the autonomous vehicle 465. The autonomous vehicle 465 can then carry out the one or more controls using the control command data 452.

Figure 5A:
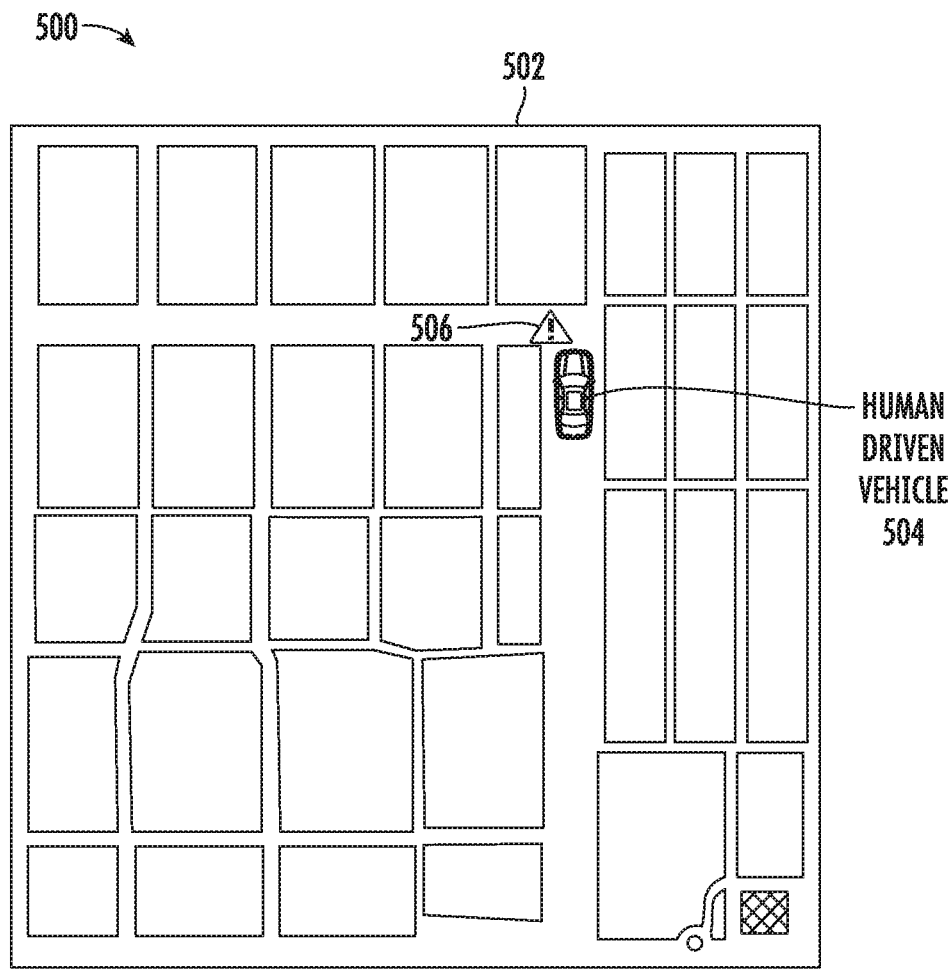
FIG. 5A illustrates a representation of a human-driven vehicle in a geographic area with an anomaly according to example embodiments of the present disclosure.

FIG. 5A illustrates a representation 500 of a human-driven vehicle in a geographic area with an anomaly according to example embodiments of the present disclosure. In this example, a human driven vehicle 504 is driving through and environment 502. Within this environment is an anomaly 506. In this example, the anomaly 506 is designated by an exclamation symbol. Anomalies can be any factor that causes a vehicle to make an unconventional decision such as one or more unexpected decisions based on the environment vehicle. For instance, anomalies, as noted above, can include traffic accidents, infrastructure failures, road blockages, emergency situations, emergency vehicles disrupting normal traffic patterns, or any other object or situation that causes a vehicle to diverge from the normally expected behavior in a given area.

In this example, the human-driven vehicle 504 can travel a route that takes it close to the anomaly 506. The human-driven vehicle 504 can consistently upload information describing the vehicle's current navigation data to a remote data evaluation system (e.g., data evaluation system 410 in FIG. 4). When the human-driven vehicle 504 encounters the anomaly 506 it may produce anomalous traffic data. In response to receiving the anomalous traffic data, the data evaluation system (e.g., data evaluation system 410 in FIG. 4) can determine that anomaly 506 has been encountered.

Figure 5B:
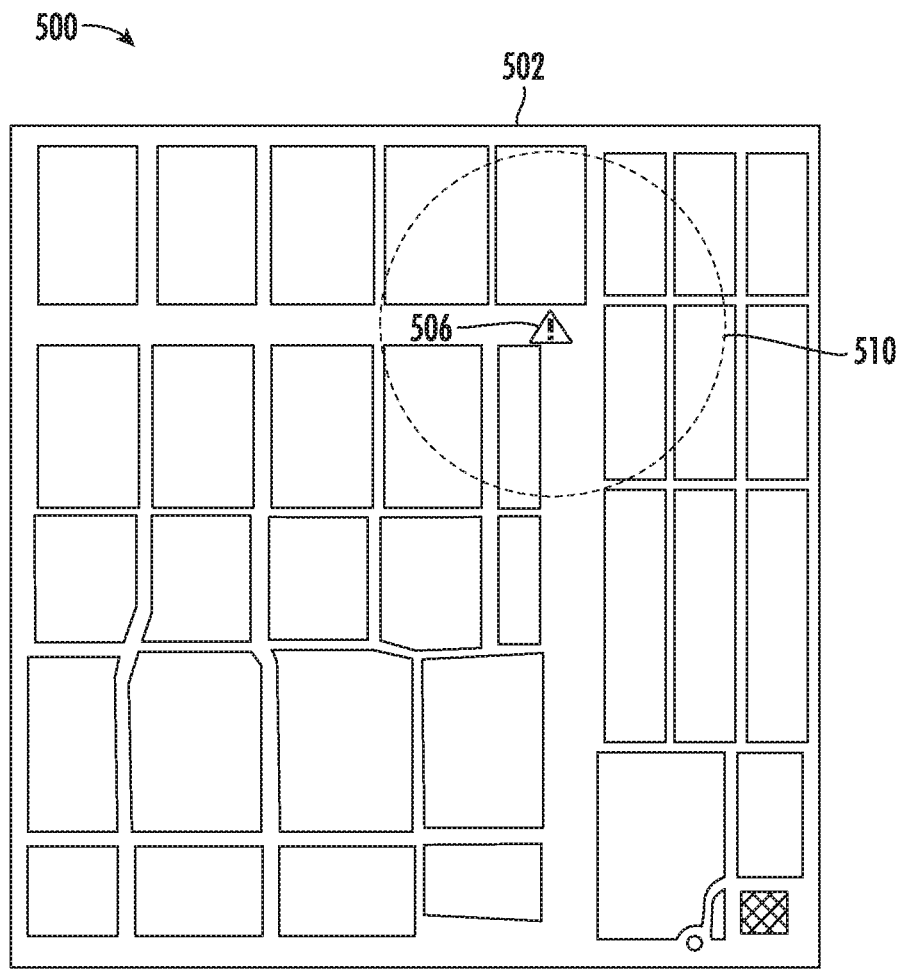
FIG. 5B illustrates a representation of a geofence in a geographic area with an anomaly according to example embodiments of the present disclosure.

FIG. 5B illustrates a representation 500 of a geofence in a geographic area with an anomaly according to example embodiments of the present disclosure. Following from the previous example in FIG. 5A, once the data evaluation system (e.g., data evaluation system 410 in FIG. 4) has received traffic data that indicates a navigation anomaly 506 may exist at a particular location, the data evaluation system (e.g., data evaluation system 410 in FIG. 4) may create geofence 510. In this example, the geofence 510 is created to be circular around the estimated position of the anomaly 506. However, other shapes and configurations can be used to define the extent and boundaries of the geofence 510 based on the type of anomaly determined and the confidence that the anomaly 506 actually exists.

Figure 5C:
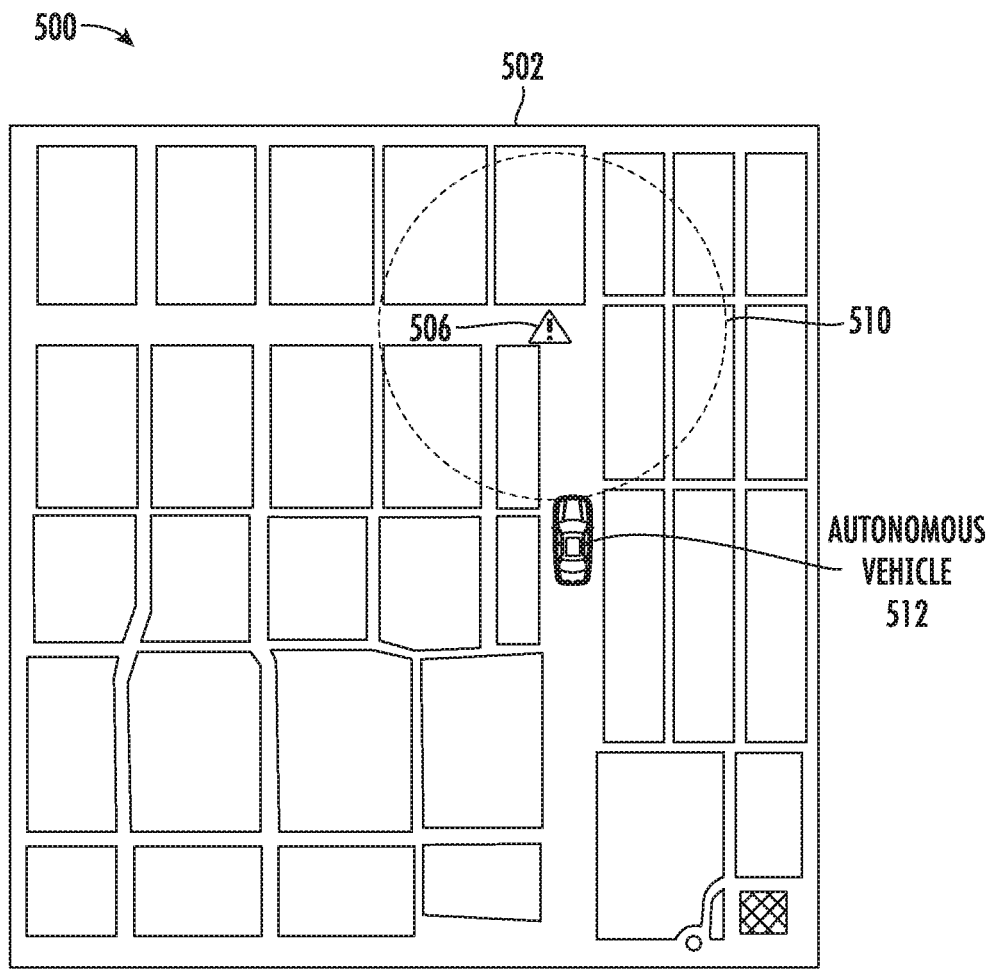
FIG. 5C illustrates a representation of an autonomous vehicle crossing a geofence in a geographic area with an anomaly according to example embodiments of the present disclosure.

FIG. 5C illustrates a representation 500 of an autonomous vehicle 512 crossing a geofence 510 in a geographic area 502 with an anomaly 506 according to example embodiments of the present disclosure. Continuing the example from FIG. 5B, once the geofence 510 has been established, a location tracking system (e.g., location tracking system 424) can receive location data from a plurality of autonomous vehicles. The location tracking system (e.g., location tracking system 424) can compare the received location data with the area enclosed by the geofence 510. When an autonomous vehicle 512 crosses the geofence 510, the location tracking system (e.g., location tracking system 424) may initiate a remote assistance session.

Figure 6:
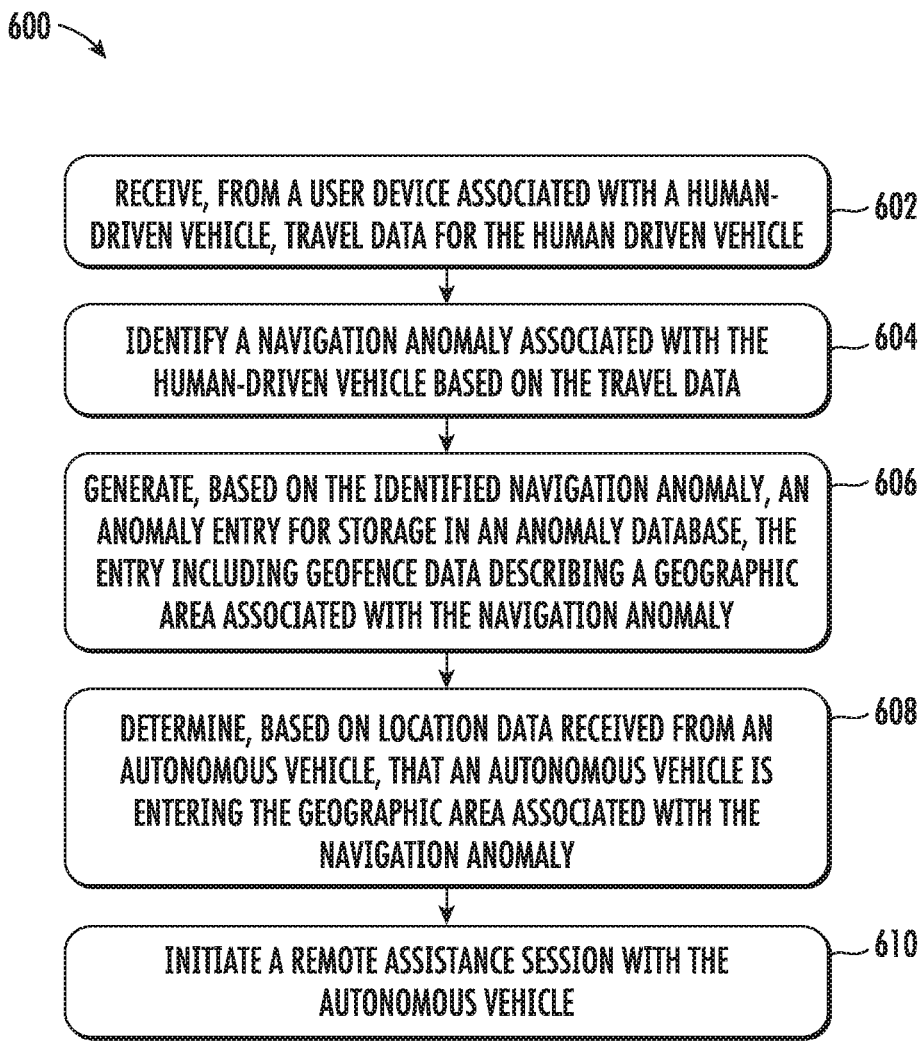
FIG. 6 depicts a flow chart diagram of an example method according to example embodiments of the present disclosure.

FIG. 6 depicts a flow chart diagram of an example method according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 1-4.

In some examples, the anomaly monitoring system (e.g., anomaly monitoring system 420 in FIG. 4) can, at 602, receive, from a user device associated with a human-driven vehicle, travel data for the human-driven vehicle. Travel data can include data describing at least one of the average speed, location, direction, heading, or route of the human-driven vehicle. The travel data can also include stop data that describes the location and timing when the human-driven vehicle comes to a stop. For example, the travel data can include data describing the acceleration of the human-driven vehicle. The user device can be a smartphone associated with the driver of the human-driven vehicle, a beacon device placed in the vehicle, and/or a computing system integrated into the human-driven vehicle itself.

The anomaly monitoring system (e.g., anomaly monitoring system 420 in FIG. 4) can, at 604, identify a navigation anomaly associated with the human-driven vehicle based on the travel data. In response to identifying a navigation anomaly associated with the human-driven vehicle based on the travel data, the anomaly monitoring system (e.g., anomaly monitoring system 420 in FIG. 4) can determine whether an anomaly entry corresponding to the navigation anomaly exists in the anomaly database. In response to determining that a corresponding anomaly entry exists in the anomaly database, the anomaly monitoring system (e.g., anomaly monitoring system 420 in FIG. 4) can update the confidence value associated with the navigation anomaly.

The anomaly monitoring system (e.g., anomaly monitoring system 420 in FIG. 4) can, at 606, generate, based on the identified navigation anomaly, an anomaly entry for storage in an anomaly database, the entry including geofence data describing a geographic area associated with the navigation anomaly. The anomaly monitoring system (e.g., anomaly monitoring system 420 in FIG. 4) can determine an anomaly type associated with the identified navigation anomaly. Anomaly types can include, but are not limited to, obstruction anomalies (e.g., an obstacle in the road), an emergency situation anomaly (e.g., an accident or an emergency vehicle passing through the area), a heavy traffic anomaly (e.g., passage through an area significantly slowed by excessive numbers of vehicles), infrastructure breakdown (e.g., traffic light power off such that directions are given manually by a law enforcement officer), and so on.

The anomaly monitoring system (e.g., anomaly monitoring system 420 in FIG. 4) can determine, based on travel data for the human-driven vehicle, a current average speed of the human-driven vehicle. The anomaly monitoring system (e.g., anomaly monitoring system 420 in FIG. 4) can access past average speed data for a geographic location associated with the human-driven vehicle to determine a past average speed. The anomaly monitoring system (e.g., anomaly monitoring system 420 in FIG. 4) can determine whether the difference between the current average speed of the human-driven vehicle and the past average speed exceeds a threshold. The anomaly monitoring system (e.g., anomaly monitoring system 420 in FIG. 4) can, in accordance with a determination that the difference between the current average speed of the human-driven vehicle and the past average speed exceeds a threshold, determine that the navigation anomaly exists.

The anomaly monitoring system (e.g., anomaly monitoring system 420 in FIG. 4) can determine, based on travel data for the human-driven vehicle, one or more stopping points for the human-driven vehicle. The anomaly monitoring system (e.g., anomaly monitoring system 420 in FIG. 4) can access past stopping data for a geographic location associated with the human-driven vehicle. The anomaly monitoring system (e.g., anomaly monitoring system 420 in FIG. 4) can compare the one or more stopping points for the human-driven vehicle to the past stopping data for the geographic location.

The anomaly monitoring system (e.g., anomaly monitoring system 420 in FIG. 4) can determine, based on travel data for the human-driven vehicle, a current route for the human-driven vehicle. The anomaly monitoring system (e.g., anomaly monitoring system 420 in FIG. 4) can access map data for a geographic location associated with the human-driven vehicle to determine an expected route for the human-driven vehicle. The anomaly monitoring system (e.g., anomaly monitoring system 420 in FIG. 4) can compare the current route for the human-driven vehicle to the expected route for the human-driven vehicle.

The anomaly monitoring system (e.g., anomaly monitoring system 420 in FIG. 4) can, at 608, determine, based on location data received from an autonomous vehicle, that an autonomous vehicle is entering the geographic area associated with the navigation anomaly. To do so, the anomaly monitoring system (e.g., anomaly monitoring system 420 in FIG. 4) can receive current location data for the autonomous vehicle. The anomaly monitoring system (e.g., anomaly monitoring system 420 in FIG. 4) can compare the current location data to geofence data associated with one or more anomaly entries in the anomaly database. In response to determining that the current location data is within a location indicated by the geofence data associated with a specific anomaly entry in the anomaly database, the anomaly monitoring system (e.g., anomaly monitoring system 420 in FIG. 4) can analyze travel data associated with the autonomous vehicle to confirm the existence of the navigation anomaly.

In some examples, vehicles (e.g., both human-driven and autonomous) can download geofence data for any geofences that are nearby their current location. The vehicles themselves can monitor their location and notify the anomaly monitoring system if they cross any of the downloaded geofences. The geofence data can be updated as the vehicle travels, removing geofence data for geofences that become too remote and adding geofence data for geofences that are now closer.

In response to confirming, based on the travel data associated with the autonomous vehicle, the existence of the navigation anomaly, the anomaly monitoring system (e.g., anomaly monitoring system 420 in FIG. 4) can increase the confidence value associated with the navigation anomaly in the anomaly database. In response to being unable to confirm, based on the travel data associated with the autonomous vehicle, the existence of the navigation anomaly, the anomaly monitoring system (e.g., anomaly monitoring system 420 in FIG. 4) can decrease the confidence value associated with the navigation anomaly in the anomaly database.

In response to being unable to confirm, based on the travel data associated with the autonomous vehicle, the existence of the navigation anomaly, the anomaly monitoring system (e.g., anomaly monitoring system 420 in FIG. 4) can remove the anomaly entry associated with the navigation anomaly from the anomaly database.

The anomaly monitoring system (e.g., anomaly monitoring system 420 in FIG. 4) can determine, based on the anomaly type associated with the identified navigation anomaly, whether the geographic location associated with the identified navigation anomaly is passable. In response to determining that the geographic location associated with the identified navigation anomaly is not passable, the anomaly monitoring system (e.g., anomaly monitoring system 420 in FIG. 4) (or other associated system) can generate an alternative route for the autonomous vehicle. A navigation anomaly can be considered passible when the vehicle can continue along the original path to their destination. Thus, a navigation anomaly that results in additional time to a destination but does not necessitate rerouting can be considered passable. For example, an accident that results in one lane of a highway being obstructed but still allows traffic to pass through on the other, unobstructed lanes can be classified as a passable navigation anomaly.

A navigation anomaly can be classified as non-passable if the anomaly is such that the vehicle is no longer able to follow its original route to its destination. For example, if a tree falls across an entire road or an entire section of a highway is flooded, the navigation anomaly will be classified as non-passable.

The anomaly monitoring system (e.g., anomaly monitoring system 420 in FIG. 4) can, at 610, initiate a remote assistance session with the autonomous vehicle. The anomaly monitoring system can access the anomaly entry to determine a particular remote assistance operator previously associated with the navigation anomaly. The anomaly monitoring system can assign the particular remote assistance operator to the remote assistance session.

The anomaly monitoring system (e.g., anomaly monitoring system 420 in FIG. 4) can transmit a request for additional information associated with the navigation anomaly to a driver associated with the human-driven vehicle. In other examples, the anomaly monitoring system (e.g., anomaly monitoring system 420 in FIG. 4) can select, based on the anomaly entry, a remote assistance operator to provide remote assistance to the autonomous vehicle. The anomaly monitoring system (e.g., anomaly monitoring system 420 in FIG. 4) can transmit the anomaly entry to the remote assistance operator.

Figure 7:
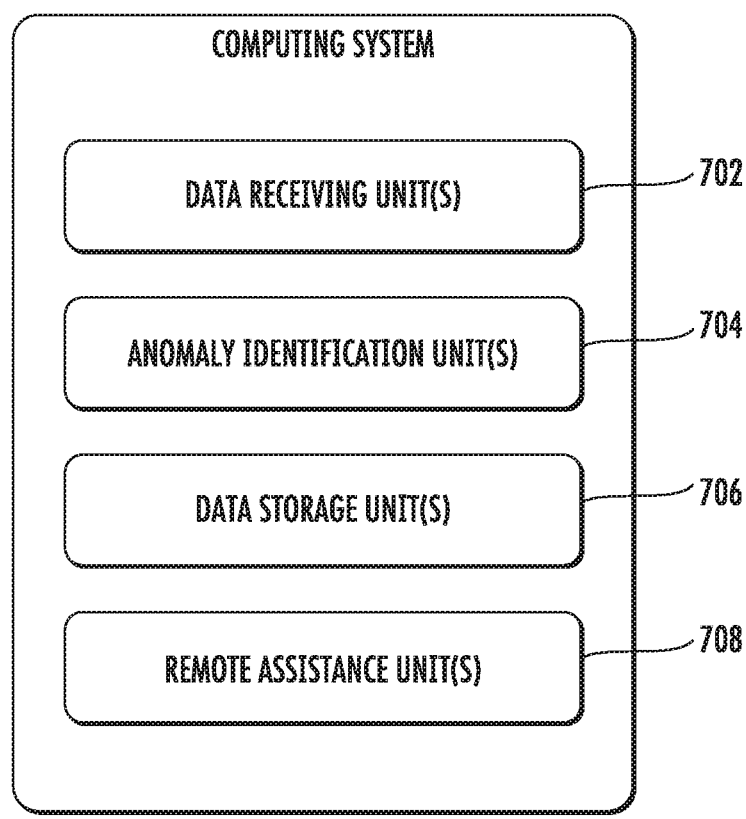
FIG. 7 depicts an example system with units for performing operations and functions according to example aspects of the present disclosure.

FIG. 7 depicts an example system with units for performing operations and functions according to example aspects of the present disclosure. Various means can be configured to perform the methods and processes described herein. For example, a computing system can include data receiving unit(s) 702, anomaly identification unit(s) 704, data storage unit(s) 706, remote assistance unit(s) 708, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to receive, from a user device associated with a human-driven vehicle, travel data for the human-driven vehicle. For example, the anomaly monitoring system can receive data representing the travel of a human-driven vehicle to analyze for anomalies. A data receiving unit 702 is one example of a means for receiving, from a user device associated with a human-driven vehicle, travel data for the human-driven vehicle.

The means can be configured to identify a navigation anomaly associated with the human-driven vehicle based on the travel data. For example, the anomaly monitoring system can analyze the received traffic data for unusual traffic patterns to determine the location of one or more navigation anomalies. An anomaly identification unit 704 is one example of a means for identifying a navigation anomaly associated with the human-driven vehicle based on the travel data.

The means can be configured to generate, based on the identified navigation anomaly, an anomaly entry for storage in an anomaly database, the entry including geofence data describing a geographic area associated with the navigation anomaly. For example, the anomaly monitoring system can generate data to add to a database of anomalies including, but not limited to, the location of the anomaly. A data storage unit 706 is one example of a means for generating, based on the identified navigation anomaly, an anomaly entry for storage in an anomaly database, the entry including geofence data describing a geographic area associated with the navigation anomaly.

The means can be configured to determine, based on location data received from an autonomous vehicle, that an autonomous vehicle is entering the geographic area associated with the navigation anomaly and initiate a remote assistance session with the autonomous vehicle. For example, the anomaly monitoring system can determine that, based on location data associated with the autonomous vehicle, the vehicle crossed an established geofence. The anomaly monitoring system can then generate a remote assistance session for the autonomous vehicles. A remote assistance unit 708 is one example of a means for determining, based on location data received from an autonomous vehicle, that an autonomous vehicle is entering the geographic area associated with the navigation anomaly and in response, initiating a remote assistance session with the autonomous vehicle.

Figure 8:
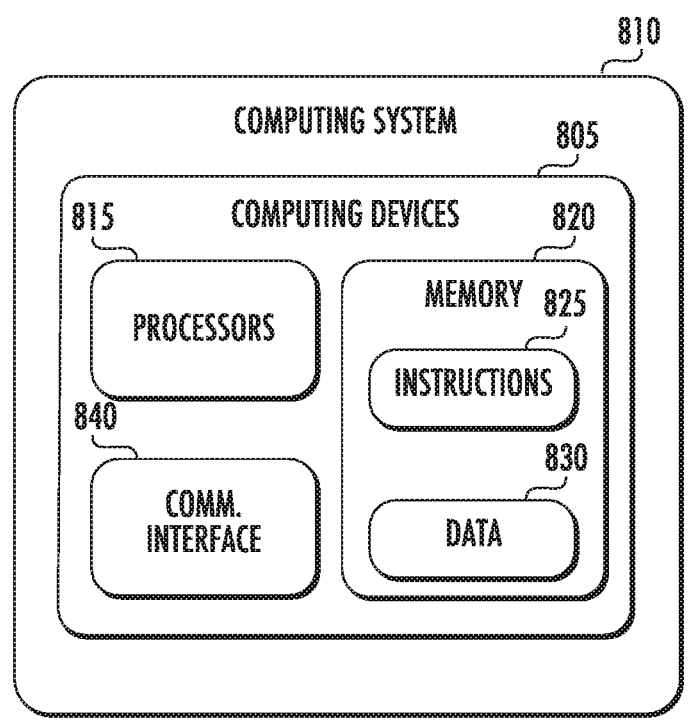
FIG. 8 depicts example system components according to example aspects of the present disclosure.

FIG. 8 depicts example system components according to example aspects of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The computing system 800 can be and/or include the vehicle computing system 112 of FIG. 1. The computing system 800 can be associated with a central operations system and/or an entity associated with the vehicle 105 such as, for example, a vehicle owner, vehicle manager, fleet operator, service provider, etc.

The computing device(s) 805 of the computing system 800 can include processor(s) 815 and at least one memory 820. The one or more processors 815 can be any suitable processing device (e.g., a processor core, a microprocessor, an ASIC, an FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, magnetic disks, data registers, etc., and combinations thereof.

The memory 820 can store information that can be accessed by the one or more processors 815. For instance, the memory 820 (e.g., one or more non-transitory computer-readable storage mediums, memory devices) can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815

For example, the memory 820 on-board the vehicle 105 can store instructions 825 that when executed by the one or more processors 815 cause the one or more processors 815 (e.g., in the vehicle computing system 112) to perform operations such as any of the operations and functions of the computing device(s) 805 and/or vehicle computing system 112, any of the operations and functions for which the vehicle computing system 112 is configured, and/or any other operations and functions described herein.

The memory 820 can store data 830 that can be obtained (e.g., received, accessed, written, manipulated, created, generated, etc.) and/or stored. The data 830 can include, for instance, services data (e.g., trip data, route data, user data, etc.), sensor data, map data, perception data, prediction data, motion planning data, object states and/or state data, anomaly data, geofence data, and/or other data/information as described herein. In some implementations, the computing device(s) 805 can obtain data from one or more memories that are remote from the autonomous vehicle 102.

The computing device(s) 805 can also include a communication interface 840 used to communicate with one or more other system(s) (e.g., the remote computing system). The communication interface 840 can include any circuits, components, software, etc. for communicating via one or more networks (e.g., network(s)). In some implementations, the communication interface 840 can include, for example, one or more of: a communications controller, a receiver, a transceiver, a transmitter, a port, conductors, software, and/or hardware for communicating data.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for using navigation anomaly data to improve remote assistance service, the method comprising:
   receiving, by a computing system with one or more processors from a computing device associated with a human-driven vehicle, travel data for the human-driven vehicle;
   identifying, by the computing system, a navigation anomaly associated with the human-driven vehicle based on the travel data;
   generating, by the computing system and based on the identified navigation anomaly, an anomaly entry for storage in an anomaly database, the anomaly entry comprising geofence data describing a geographic area associated with the navigation anomaly;

determining, by the computing system based on location data received from an autonomous vehicle and the geofence data, that the autonomous vehicle is entering the geographic area associated with the navigation anomaly;

determining that a confidence value associated with the anomaly entry meets a threshold condition, the confidence value describing a confidence that an anomaly exists at the geographic area; and initiating, by the computing system, a remote assistance session with the autonomous vehicle.

2. The computer-implemented method of claim 1, wherein the travel data describes at least one of a speed, location, direction, heading, acceleration, or route of the human-driven vehicle.

3. The computer-implemented method of claim 1, wherein the travel data includes stop data that describes a location and a timing when the human-driven vehicle comes to a stop.

4. The computer-implemented method of claim 1, wherein initiating a remote assistance session with the autonomous vehicle further comprises:

accessing, by the computing system, the anomaly entry to determine a particular remote assistance operator previously associated with the navigation anomaly; and assigning, by the computing system, the particular remote assistance operator to the remote assistance session.

5. The computer-implemented method of claim 1, wherein determining a navigation anomaly comprises:

determining, by the computing system and based on the travel data for the human-driven vehicle, a current average speed of the human-driven vehicle;

accessing, by the computing system, past average speed data for a geographic location associated with the human-driven vehicle to determine a past average speed;

determining, by the computing system, whether a difference between the current average speed of the human-driven vehicle and the past average speed exceeds a threshold speed value; and in accordance with a determination that the difference between the current average speed of the human-driven vehicle and the past average speed exceeds the threshold speed value, determining, by the computing system, that the navigation anomaly exists.

6. The computer-implemented method of claim 1, wherein determining a navigation anomaly comprises:

determining, by the computing system and based on the travel data for the human-driven vehicle, one or more stop points for the human-driven vehicle;

accessing, by the computing system, past stopping data for a geographic location associated with the human-driven vehicle; and comparing, by the computing system, the one or more stop points for the human-driven vehicle to the past stopping data for the geographic location.

7. The computer-implemented method of claim 1, wherein determining a navigation anomaly comprises:

determining, by the computing system and based on travel data for the human-driven vehicle, a current route for the human-driven vehicle;

accessing, by the computing system, map data for a geographic location associated with the human-driven vehicle to determine an expected route for the human-driven vehicle; and comparing, by the computing system, the current route for the human-driven vehicle to the expected route for the human-driven vehicle.

8. The computer-implemented method of claim 1, wherein generating an anomaly entry comprises:

in response to identifying the navigation anomaly associated with the human-driven vehicle based on the travel data, determining, by the computing system, whether the anomaly entry corresponding to the navigation anomaly exists in the anomaly database.

9. The computer-implemented method of claim 8, wherein generating an anomaly entry for storage in an anomaly database comprises:

in response to determining that the anomaly entry exists in the anomaly database, updating, by the computing system, the confidence value associated with the navigation anomaly to increase the confidence that the anomaly exists at the geographic area anomaly.

10. The computer-implemented method of claim 1, wherein generating an anomaly entry comprises:

determining, by the computing system, an anomaly type associated with the navigation anomaly; and generating a geofence with specific geographic boundaries to use as geofence data.

11. The computer-implemented method of claim 10, wherein the geofence is generated based on the anomaly type associated with the navigation anomaly and the geographic area associated with the navigation anomaly.

12. The computer-implemented method of claim 1, wherein the computing device associated with the human-driven vehicle is a smartphone.

13. A computing system for using traffic anomalies to improve remote assistance, the system comprising:

one or more processors and a non-transitory computer-readable memory;

wherein the non-transitory computer-readable memory stores instructions that, when executed by the processor, cause the computing system to perform operations, the operations comprising:

receiving, from a computing device associated with a human-driven vehicle, travel data for the human-driven vehicle;

identifying a navigation anomaly associated with the human-driven vehicle based on the travel data;

generating, based on the navigation anomaly, an anomaly entry for storage in an anomaly database, the anomaly entry comprising geofence data describing a geographic area associated with the navigation anomaly;

determining, based on location data received from an autonomous vehicle and the geofence data, that that autonomous vehicle is entering the geographic area associated with the navigation anomaly;

determining that a confidence value associated with the anomaly entry meets a threshold condition, the confidence value describing a confidence that an anomaly exists at the geographic area; and initiating a remote assistance session with the autonomous vehicle.

14. The computing system of claim 13, wherein generating an anomaly entry for storage in an anomaly database further comprises:

determining an anomaly type associated with the identified navigation anomaly.

15. The computing system of claim 14, wherein determining that an autonomous vehicle is entering the geographic area associated with the navigation anomaly further comprises:

determining, based on the anomaly type associated with the identified navigation anomaly, whether a geographic location associated with the identified navigation anomaly is passable; and in response to determining that the geographic location associated with the identified navigation anomaly is not passable, generating an alternative route for the autonomous vehicle.

16. The computing system of claim 15, wherein determining that the autonomous vehicle is entering the geographic area associated with the navigation anomaly further comprises:

receiving current location data for the autonomous vehicle;

comparing the current location data to the geofence data associated with one or more anomaly entries in the anomaly database; and in response to determining that the current location data is within a location indicated by the geofence data associated with a specific anomaly entry in the anomaly database, analyzing travel data associated with the autonomous vehicle to confirm an existence of the navigation anomaly.

17. The computing system of claim 15, the operations further comprising:

in response to confirming, based on the travel data associated with the autonomous vehicle, the existence of the navigation anomaly, increasing the confidence value associated with the navigation anomaly, the confidence value being associated with the in the anomaly database.

18. The computing system of claim 15 the operations further comprising:

in response to being unable to confirm, based on the travel data associated with the autonomous vehicle, the existence of the navigation anomaly, decreasing the confidence value associated with the navigation anomaly in the anomaly database.

19. The computing system of claim 15, the operations further comprising:

in response to being unable to confirm, based on the travel data associated with the autonomous vehicle, the existence of the navigation anomaly, removing the anomaly entry associated with the navigation anomaly from the anomaly database.

20. A non-transitory computer-readable medium storing instruction that, when executed by one or more computing devices, cause the one or more computing devices to perform operations, the operations comprising:

receiving, from a computing device associated with a human-driven vehicle, travel data for the human-driven vehicle;

identifying a navigation anomaly associated with the human-driven vehicle based on the travel data;

generating, based on the identified navigation anomaly, an anomaly entry for storage in an anomaly database, the anomaly entry including geofence data describing a geographic area associated with the navigation anomaly;

determining, based on location data, that an autonomous vehicle is entering the geographic area associated with the navigation anomaly;

determining that a confidence value associated with the anomaly entry meets a threshold condition, the confidence value describing a confidence that an anomaly exists at the geographic area; and initiating a remote assistance session with the autonomous vehicle.

21. The computer-implemented method of claim 20, wherein generating an anomaly entry for storage in an anomaly database comprises:

in response to identifying the navigation anomaly associated with the human-driven vehicle based on the travel data, determining, by the computing system, whether the anomaly entry corresponding to the navigation anomaly exists in the anomaly database; and updating, by the computing system, the confidence value associated with the navigation anomaly to increase the confidence that the anomaly exists at the geographic area anomaly.

* * * * *

UNITED STATES PATENT AND TRADEMARK OFFICE
CERTIFICATE OF CORRECTION

| | |
|---|---|
| PATENT NO. | : 11,704,998 B2 |
| APPLICATION NO. | : 16/868001 |
| DATED | : July 18, 2023 |
| INVENTOR(S) | : Huang et al. |

It is certified that error appears in the above-identified patent and that said Letters Patent is hereby corrected as shown below:

In the Claims

In Column 36, Line 50, in Claim 13, delete "that that" and insert --that the-- therefor In Column 37, Line 31, in Claim 17, after "with the", insert --navigation anomaly--

Signed and Sealed this
Seventeenth Day of October, 2023

Katherine Kelly Vidal
*Director of the United States Patent and Trademark Office*